United States Patent
Sugaya

(10) Patent No.: US 10,708,814 B2
(45) Date of Patent: Jul. 7, 2020

(54) WIRELESS COMMUNICATION DEVICE AND WIRELESS COMMUNICATION METHOD

(71) Applicant: SONY CORPORATION, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,624

(22) PCT Filed: Nov. 25, 2016

(86) PCT No.: PCT/JP2016/085052
§ 371 (c)(1),
(2) Date: Jul. 17, 2018

(87) PCT Pub. No.: WO2017/145471
PCT Pub. Date: Aug. 31, 2017

(65) Prior Publication Data
US 2019/0150021 A1 May 16, 2019

(30) Foreign Application Priority Data
Feb. 22, 2016 (JP) .................................. 2016-030617

(51) Int. Cl.
*H04W 28/04* (2009.01)
*H04W 56/00* (2009.01)
(Continued)

(52) U.S. Cl.
CPC ............. *H04W 28/04* (2013.01); *H04L 1/009* (2013.01); *H04L 1/0061* (2013.01);
(Continued)

(58) Field of Classification Search
CPC ... H04L 1/004–0091; H04L 1/08–1896; H04L 12/1872; H04L 29/08; H04L 47/28;
(Continued)

(56) References Cited

U.S. PATENT DOCUMENTS

| | | | |
|---|---|---|---|
| 2010/0260091 A1 | 10/2010 | Seok | |
| 2012/0084616 A1* | 4/2012 | Wentink | H04L 1/1614 714/748 |
| 2017/0012742 A1* | 1/2017 | Zhu | H04L 1/1614 714/748 |

FOREIGN PATENT DOCUMENTS

| | | | |
|---|---|---|---|
| EP | 1 764 942 A2 | 3/2007 | |
| EP | 1764942 A2 * | 3/2007 | |

(Continued)

OTHER PUBLICATIONS

European Extended Search Report dated Feb. 1, 2019, issued in corresponding European Application No. 16891627.
(Continued)

*Primary Examiner* — Timothy J Weidner
(74) *Attorney, Agent, or Firm* — Xsensus LLP

(57) ABSTRACT

[Object] To provide a mechanism capable of improving the efficiency of wireless communication even in a case in which the sequence numbers of received data units are non-sequential.
[Solution] A wireless communication device including: a processing unit that generates a protocol data unit (PDU) that has sequence information with which a sequence number of a data unit that is determined as being to be resent is specified; and a communication unit that transmits the PDU generated by the processing unit. A wireless communication device including: a communication unit that receives a protocol data unit (PDU) that has sequence information with which a sequence number of a data unit that is determined as being to be resent is specified; and an acquisition unit that acquires the sequence information from the PDU received by the communication unit.

18 Claims, 15 Drawing Sheets

(51) Int. Cl.

| | | |
|---|---|---|
| *H04W 28/06* | (2009.01) | |
| *H04W 28/02* | (2009.01) | |
| *H04W 4/06* | (2009.01) | |
| *H04L 12/841* | (2013.01) | |
| *H04L 12/801* | (2013.01) | |
| *H04L 12/18* | (2006.01) | |
| *H04L 1/18* | (2006.01) | |
| *H04L 1/16* | (2006.01) | |
| *H04L 1/08* | (2006.01) | |
| *H04L 1/00* | (2006.01) | |
| *H04L 29/08* | (2006.01) | |

(52) U.S. Cl.
CPC .......... *H04L 1/0079* (2013.01); *H04L 1/0091* (2013.01); *H04L 1/08* (2013.01); *H04L 1/16* (2013.01); *H04L 1/165* (2013.01); *H04L 1/1642* (2013.01); *H04L 1/189* (2013.01); *H04L 1/1854* (2013.01); *H04L 12/1872* (2013.01); *H04L 29/08* (2013.01); *H04L 47/28* (2013.01); *H04L 47/34* (2013.01); *H04W 4/06* (2013.01); *H04W 28/0215* (2013.01); *H04W 28/06* (2013.01); *H04W 56/003* (2013.01); *H04L 2001/0093* (2013.01)

(58) Field of Classification Search
CPC .. H04L 47/34; H04L 2001/0093; H04W 4/06; H04W 28/02–0215; H04W 28/14; H04W 56/001–003; H04W 28/0273–14
See application file for complete search history.

(56) References Cited

FOREIGN PATENT DOCUMENTS

| | | |
|---|---|---|
| EP | 2 040 408 A2 | 3/2009 |
| EP | 2040408 A2 * | 3/2009 |
| JP | 2006-352897 A | 12/2006 |
| JP | 2006352897 A * | 12/2006 |
| JP | 2008-263511 A | 10/2008 |
| JP | 2008263511 A * | 10/2008 |
| JP | 2009-027645 A | 2/2009 |
| JP | 2009027645 A * | 2/2009 |
| JP | 4444237 B2 | 1/2010 |
| WO | 2012/045049 A1 | 4/2012 |

OTHER PUBLICATIONS

International Search Report dated Feb. 7, 2017 in PCT/JP2016/085052 filed Nov. 25, 2016.
Communication Pursuant to Article 94(3) EPC issued in European Application 16 891 627.8-1219 dated Nov. 26, 2019.

* cited by examiner

FIG. 9

| Sequence Number | Frame Use | Valid Sequence Map |
|---|---|---|
| 1 | Multicast A | 0000 0000 0000 0001 |
| 2 | Multicast B | 0000 0000 0000 0001 |
| 3 | Multicast A | 0000 0000 0000 0101 |
| 4 | Broadcast | 0000 0000 0000 0000 |
| 5 | Multicast A | 0000 0000 0001 0101 |
| 6 | Multicast B | 0000 0000 0001 0001 |
| 7 | Multicast A | 0000 0000 0101 0101 |
| 8 | Multicast A | 0000 0000 1010 1011 |
| 9 | Multicast B | 0000 0000 1000 1001 |
| 10 | Management | 0000 0000 0000 0001 |
| 11 | Multicast A | 0000 0001 0101 1001 |
| 12 | Multicast A | 0000 0010 1011 0011 |
| 13 | Broadcast | 0000 0000 0000 0000 |
| 14 | Multicast B | 0000 0001 0010 0001 |
| 15 | Multicast A | 0000 0101 1001 1001 |
| 16 | Multicast A | 0000 0001 0011 0011 |
| 17 | Multicast B | 0000 0000 0000 1001 |
| 18 | Multicast C | 0000 0000 0000 0000 |
| 19 | Management | 0000 0000 0000 0000 |
| 20 | Multicast B | 0000 0000 0000 0001 |

FIG. 11

| Sequence Number | Frame Use | Start Sequence Number | Valid Sequence Map |
|---|---|---|---|
| 1 | Multicast A | 1 | 1000 0000 0000 0000 |
| 2 | Multicast B | 2 | 1000 0000 0000 0000 |
| 3 | Multicast A | 1 | 1010 0000 0000 0000 |
| 4 | Broadcast | 4 | 0000 0000 0000 0000 |
| 5 | Multicast A | 1 | 1010 1000 0000 0000 |
| 6 | Multicast B | 2 | 1000 1000 0000 0000 |
| 7 | Multicast A | 1 | 1010 1010 0000 0000 |
| 8 | Multicast A | 1 | 1010 1011 0000 0000 |
| 9 | Multicast B | 2 | 1000 1001 0000 0000 |
| 10 | Management | 10 | 1000 0000 0000 0000 |
| 11 | Multicast A | 3 | 1010 1100 1000 0000 |
| 12 | Multicast A | 3 | 1010 1100 1100 0000 |
| 13 | Broadcast | 13 | 0000 0000 0000 0000 |
| 14 | Multicast B | 6 | 1001 0000 1000 0000 |
| 15 | Multicast A | 5 | 1001 1001 1001 0000 |
| 16 | Multicast A | 8 | 1001 1001 1100 0000 |
| 17 | Multicast B | 14 | 1000 0000 0000 0000 |
| 18 | Multicast C | 18 | 0000 0000 0000 0000 |
| 19 | Management | 19 | 0000 0000 0000 0000 |
| 20 | Multicast B | 20 | 1000 0000 0000 0000 |

US 10,708,814 B2

WIRELESS COMMUNICATION DEVICE AND WIRELESS COMMUNICATION METHOD

TECHNICAL FIELD

The present disclosure relates to wireless communication devices and wireless communication methods.

BACKGROUND ART

In recent years, wireless local area networks (LANs) representative of Institute of Electrical and Electronics Engineers (IEEE) 802.11 have been widely used. In addition, the number of wireless LAN-compatible products (hereinafter, also referred to as wireless communication devices) have also increased in accordance with this. In contrast, wireless communication resources available for communication are limited. Therefore, it is desirable to increase the efficiency of communication between wireless communication devices.

As an example of technologies for improving efficiency of communication, there is a technology of reducing the overheads using a physical layer (PHY) frame. Specifically, there is a technology of transmitting an aggregated frame that is obtained by aggregating a plurality of media access control (MAC) frames as PHY frames. In this manner, there are fewer PHY headers as compared with a case in which MAC frames are stored in individual PHY frames and are transmitted.

In addition, there are cases in which it is not always necessary to return an acknowledgement (ACK) for a transmitted frame. On the contrary, there is also concern that an improvement in efficiency of communication will be reduced if an ACK is returned for all transmission frames.

Meanwhile, Patent Literature 1, for example, discloses a wireless communication device in which a bitmap indicating an ACK policy for a plurality of MAC frames is stored in a MAC super frame that has a plurality of MAC frames, and if an MAC super frame is received, an ACK frame is transmitted in accordance with the bitmap.

Note that a wireless communication device that transmits an ACK frame generally waits to resend a frame that has been failed to be received. According to IEEE 802.11 standards, for example, sequence numbers are managed for each traffic stream, and data with sequential sequence numbers is provided to a higher-order layer. Therefore, in a case in which a part of the sequence numbers is missing, the wireless communication device waits for resending of the MAC frame that has data corresponding to this part of the sequence numbers until the MAC frame is successfully received.

CITATION LIST

Patent Literature

Patent Literature 1: JP 4444237B

DISCLOSURE OF INVENTION

Technical Problem

However, it is desirable to further improve the efficiency of wireless communication. According to the technology in the related art, a representative example of which is disclosed in Patent Literature 1, time-out of a MAC frame that has not successfully been received is waited for before resending. However, there may be a case in which a wireless communication device on a transmission side has already suspended the resending. In that case, a wireless communication device on a reception side continuously waits for resending until the time-out. Here, when a part of sequential sequence numbers is in a missing state, data with sequence numbers other than this part continues to be held by the wireless communication device on the reception side. Therefore, there is concern that there will be no vacancy in a data storage region and frames transmitted until the time-out will not be received. As a result, the overall efficiency of communication may be degraded.

Thus, the present disclosure will propose a mechanism capable of improving the efficiency of wireless communication even in a case in which the sequence numbers of received data units are non-sequential.

Solution to Problem

According to the present disclosure, there is provided a wireless communication device including: a processing unit that generates a protocol data unit (PDU) that has sequence information with which a sequence number of a data unit that is determined as being to be resent is specified; and a communication unit that transmits the PDU generated by the processing unit.

According to the present disclosure, there is provided a wireless communication device including: a communication unit that receives a protocol data unit (PDU) that has sequence information with which a sequence number of a data unit that is determined as being to be resent is specified; and an acquisition unit that acquires the sequence information from the PDU received by the communication unit.

In addition, according to the present disclosure, there is provided a wireless communication method including, by using a processor: generating a protocol data unit (PDU) that has sequence information with which a sequence number of a data unit that is determined as being to be resent is specified; and transmitting the generated PDU.

Advantageous Effects of Invention

According to the present disclosure, a mechanism capable of improving the efficiency of wireless communication even in a case in which the sequence numbers of received data unit are non-sequential is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is a diagram for describing an operation example of the wireless communication system according to the embodiment of the present disclosure.

FIG. 11 is a diagram for describing an operation example of a wireless communication system according to the first modification example of the embodiment of the present disclosure.

MODE(S) FOR CARRYING OUT THE INVENTION

Figure 1:
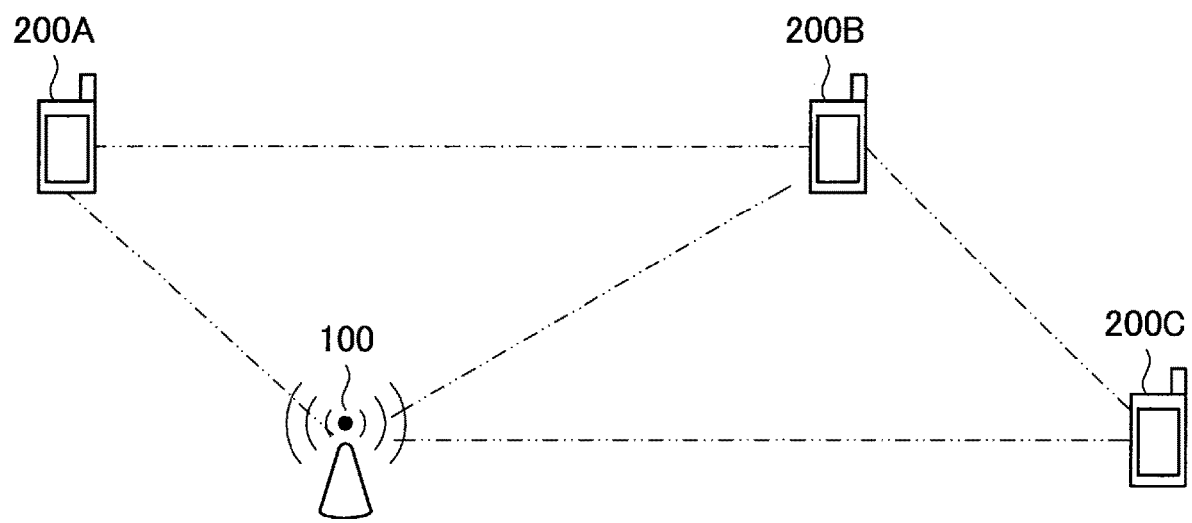
FIG. 1 is a diagram illustrating a configuration example of a wireless communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of structural elements having substantially the same function are distinguished by adding different numbers to the end of the same reference numeral. For example, a plurality of structural elements having substantially the same function are distinguished as necessary like a STA 200A and a STA 200B. However, in a case where it is unnecessary to distinguish structural elements having substantially the same function, only the same reference numeral is added. For example, in a case where it is unnecessary to particularly distinguish the STA 200A and the STA 200B, they are simply referred to as "STAs 200."

Note that description will be given in the following order.
1. Embodiment of the present disclosure
1-1. Configuration of wireless communication system
1-2. Basic functions of wireless communication device
1-3. Detailed functions of wireless communication device
1-4. Processing of wireless communication device
1-5. Application examples
1-6. Summary of embodiment of the present disclosure
1-7. Modification examples
2. Advanced application examples
3. Conclusion

1. EMBODIMENT OF THE PRESENT DISCLOSURE

First, a wireless communication system and a wireless communication device, which is one of components of the wireless communication system, according to an embodiment of the present disclosure will be described.

1-1. Configuration of Wireless Communication System

The wireless communication system according to the embodiment of the present disclosure will be described with reference to FIG. 1. FIG. 1 is a diagram illustrating a configuration example of the wireless communication system according to the embodiment of the present disclosure.

The wireless communication system according to the embodiment of the present disclosure includes a plurality of wireless communication devices. The wireless communication devices communicate frames with each other. Further, the wireless communication devices have a function of communicating frames directed to the plurality of wireless communication devices.

For example, a wireless communication system according to the embodiment of the present disclosure includes an AP 100 and STAs 200A to 200C as illustrated in FIG. 1. The AP 100 can communicate with the respective STAs 200A to 200C, and the STA 200A can communicate with the AP 100 and the STA 200B. In addition, the STA 200B can communicate with the AP 100, the STAs 200A and 200C, and the STA 200C can communicate with the AP 100 and the STA 200B. The AP 100 individually transmits respective unicast frames to the respective STAs 200A to 200C and transmits multicast frames directed to the STAs 200A to 200C. Although communication among the STAs 200A to 200C is performed via the AP 100, communication may be performed directly among the STAs 200A to 200C.

Here, sequence numbers are used in communication of frames in some cases. For example, a wireless communication device that transmits frames (hereinafter, also referred to as a transmission device) transmits, to a wireless communication device that is a destination (hereinafter, also referred to as a reception device), frames that have sequence numbers managed for each reception device. Then, the reception device ascertains an order of frames received in accordance with the sequence numbers. In addition, the reception device can also ascertain overlapping of frames from the sequence numbers.

However, the sequence numbers managed by the reception device are non-sequential in multicast communication in some cases. For example, when the sequence numbers are shared by the same traffic identifier (TID), the same sequence counter is used even if multicast groups are different. Therefore, a sequence number is updated even if a multicast frame directed to a multicast group that is different from a multicast group to which the reception device belongs is transmitted. Here, since the reception device does not receive the multicast frame, the reception device cannot ascertain the sequence number before the updating. Therefore, the sequence number before the updating is missing, and the sequence numbers become non-sequential in the reception device.

Meanwhile, the reception device waits for reception of a frame with the missing sequence number. For example, the reception device waits for resending of the frame with the missing sequence number until time-out related to the resending of the frame occurs. This is because it is difficult to determine whether or not the frame with the missing sequence number is a frame directed to the reception device.

There is concern that efficiency of the multicast communication may be degraded as a result. According to the IEEE 802.11 standards, for example, the sequence numbers in multicast communication are shared not only by data frames but also management frames, broadcasting frames, or the like. Meanwhile, specific frames such as broadcasting frames are generally not resent. Therefore, in the reception device in which a broadcasting frame has not successfully been received, a sequence number used for the broadcasting frame is missing, and the reception device continuously waits for the reception of the broadcasting frame that is not to be resent. This similarly applies to frames directed to multicast groups to which the reception device itself does not belong as described above.

Thus, the embodiment of the present disclosure will propose a wireless communication system capable of improving the efficiency of wireless communication even in a case in which the sequence numbers of received data unit are non-sequential. Hereinafter, a wireless communication device for realizing the wireless communication system will be described in detail.

1-2. Basic Functions of Wireless Communication Device

Figure 2:
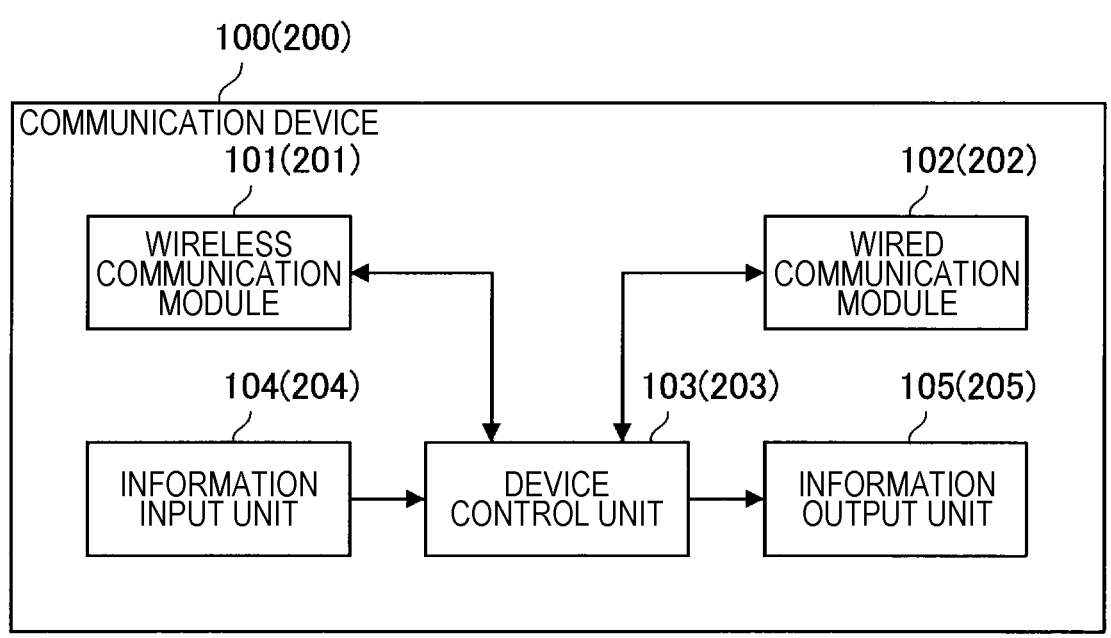
FIG. 2 is a block diagram illustrating an example of a schematic functional configuration of a wireless communication device according to the embodiment of the present disclosure.

Next, basic functions of a transmission device 100 and a reception device 200 (hereinafter, also collectively referred to as a wireless communication device 100 (200)) according to the embodiment of the present disclosure will be described. First, a functional configuration of the wireless communication device 100 (200) according to the embodiment of the present disclosure will be described with reference to FIG. 2. FIG. 2 is a block diagram illustrating an example of a schematic functional configuration of the wireless communication device 100 (200) according to the embodiment of the present disclosure.

As illustrated in FIG. 2, a wireless communication device 100 (200) includes a wireless communication module 101 (201), a wired communication module 102 (202), a device control unit 103 (203), an information input unit 104 (204), and an information output unit 105 (205).

The wireless communication module 101 (201) performs wireless communication with external devices. Specifically, the wireless communication module 101 (201) transmits data obtained from the device control unit 103 (203) and provides received data to the device control unit 103 (203). The details will be described later.

The wired communication module 102 (202) communicates with an external device via wired communication. Specifically, the wired communication module 102 (202) is connected to the Internet and communicates with the external device via the Internet. For example, the wired communication module 102 (202) transmits data acquired via communication by the wireless communication module 101 (201) to the external device via the Internet.

The device control unit 103 (203) controls operation of the wireless communication device 100 (200) in general. Specifically, the device control unit 103 (203) controls communication of the wireless communication module 101 (201) and the wired communication module 102 (202). For example, the device control unit 103 (203) causes the wireless communication module 101 (201) or the wired communication module 102 (202) to transmit data obtained from the information input unit 104 (204). Further, the device control unit 103 (203) causes the information output unit 105 (205) to output data obtained by the communication of the wireless communication module 101 (201) or the wired communication module 102 (202).

The information input unit 104 (204) receives an input from the outside of the wireless communication device 100 (200). Specifically, the information input unit 104 (204) receives a user input or information obtained from a sensor. For example, the information input unit 104 (204) is an input device such as a keyboard or a touch panel or a detection device such as a sensor.

The information output unit 105 (205) outputs data. Specifically, the information output unit 105 (205) outputs data instructed from the device control unit 103 (203). For example, the information output unit 105 (205) is a display that outputs images on the basis of image information, a speaker that outputs sounds or music on the basis of audio information, or the like.

Further, the wired communication module 102 (202), the information input unit 104 (204) and the information output unit 105 (205) among the above components may not be included in the wireless communication device 100 (200).

(Configuration of Wireless Communication Module)

Figure 3:
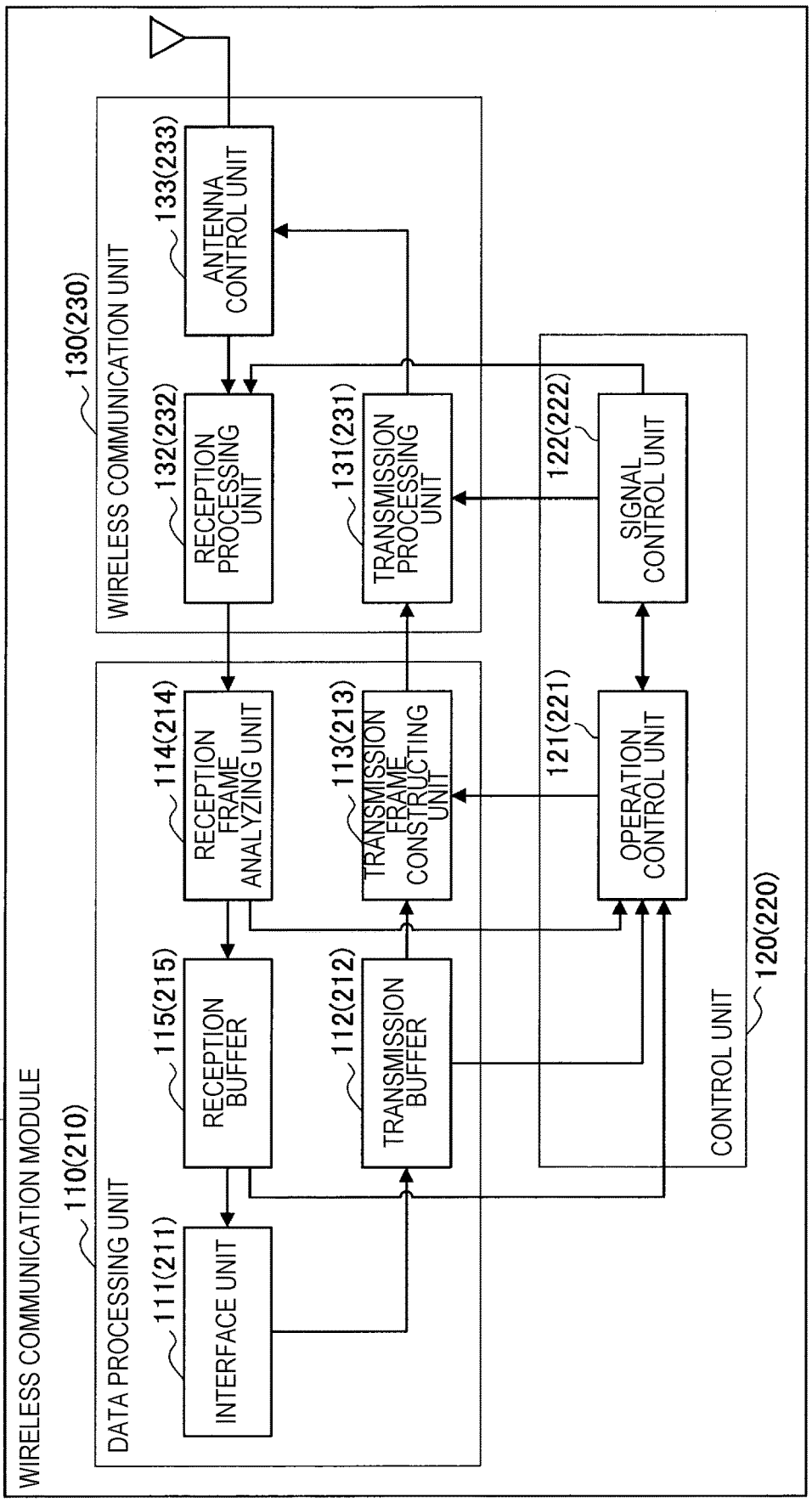
FIG. 3 is a block diagram illustrating an example of a schematic functional configuration of a wireless communication module according to the embodiment of the present disclosure.

Next, a functional configuration of the wireless communication module 101 (201) will be described with reference to FIG. 3. FIG. 3 is a block diagram illustrating an example of a schematic functional configuration of the wireless communication module 101 (201) according to an embodiment of the present disclosure.

As illustrated in FIG. 3, the wireless communication module 101 (201) includes a data processing unit 110 (210), a control unit 120 (220), and a wireless communication unit 130 (230) as a communication unit.

(1. Data Processing Unit)

The data processing unit 110 (210) includes an interface unit 111 (212), a transmission buffer 112 (212), a transmission frame constructing unit 113 (213), a reception frame analyzing unit 114 (214), and a reception buffer 115 (215) as illustrated in FIG. 3 as parts of the processing unit and an acquisition unit.

The interface unit 111 (211) is an interface connected to other functional components installed in the wireless communication device 100 (200). Specifically, the interface unit 111 performs reception of data that is desired to be transmitted from another functional component, for example, the device control unit 103 (203), provision of reception data to the device control unit 103 (203), or the like.

The transmission buffer 112 (212) stores data to be transmitted. Specifically, the transmission buffer 112 (212) stores data obtained by the interface unit 111 (211).

The transmission frame constructing unit 113 (213) generates a frame to be transmitted. Specifically, the transmission frame constructing unit 113 (213) generates a frame on the basis of data stored in the transmission buffer 112 (212) or control information set by the control unit 120 (220). For example, the transmission frame constructing unit 113 (213) generates a frame (packet) from data acquired from the transmission buffer 112 (212), and performs a process of adding a MAC header for medium access control (MAC) and an error detection code to the generated frame and the like.

The reception frame analyzing unit 114 (214) analyzes a received frame. Specifically, the reception frame analyzing unit 114 (214) determines a destination of a frame received by the wireless communication unit 130 (230) and acquires data or control information included in the frame. For example, the reception frame analyzing unit 114 (214) acquires data and the like included in the received frame by performing analysis of the MAC header, detection and correction of a code error, a reordering process, and the like on the received frame.

The reception buffer 115 (215) stores received data. Specifically, the reception buffer 115 (215) stores data acquired by the reception frame analyzing unit 114 (214).

(2. Control Unit)

The control unit 120 (220) includes an operation control unit 121 (221) and a signal control unit 122 (222) as illustrated in FIG. 3 as parts of the processing unit and the acquisition unit.

The operation control unit 121 (221) controls an operation of the data processing unit 110 (210). Specifically, the operation control unit 121 (221) controls the occurrence of communication. For example, if a communication connection request occurs, the operation control unit 121 (221) causes the data processing unit 110 (210) to generate frames related to a connection process or an authentication processing such as an association process or an authentication process.

Further, the operation control unit 121 (221) controls generation of frames on the basis of a storage state of data in the transmission buffer 112 (212), an analysis result for a reception frame, or the like. For example, in a case in which data is stored in the transmission buffer 112 (212), the operation control unit 121 (221) instructs the transmission frame constructing unit 113 (213) to generate a data frame in which the data is stored. Further, in a case in which reception of a frame is confirmed by the reception frame analyzing unit 114 (214), the operation control unit 121 (221) instructs the transmission frame constructing unit 113 (213) to generate an acknowledgment frame which is a response to a received frame.

The signal control unit 122 (222) controls an operation of the wireless communication unit 130 (230). Specifically, the signal control unit 122 (222) controls a transmission/reception process of the wireless communication unit 130 (230). For example, the signal control unit 122 (222) causes the wireless communication unit 130 (230) to set a parameter for transmission and reception on the basis of an instruction from the operation control unit 121 (221).

Note that information regarding the sequence numbers or valid sequence information, which will be described later, is managed by the control unit 120 (220). For example, the control unit 120 (220) may manage sequence numbers for each TID and manage valid sequence information for each of predetermined units (for a frame purpose, for example) of multicast communication.

(3. Wireless Communication Unit)

As illustrated in FIG. 3, the wireless communication unit 130 (230), as a communication unit, includes a transmission processing unit 131 (231), a reception processing unit 132 (232), and an antenna control unit 133 (233).

The transmission processing unit 131 (231) performs a frame transmission process. Specifically, the transmission processing unit 131 (231) generates a signal to be transmitted on the basis of a frame provided from the transmission frame constructing unit 113 (213). More specifically, the transmission processing unit 131 (231) generates a signal related to a frame on the basis of a parameter set in accordance with an instruction from the signal control unit 122 (222). For example, the transmission processing unit 131 (231) generates a symbol stream by performing encoding, interleaving, and modulation on the frame provided from the data processing unit 110 (210) in accordance with a coding and modulation scheme instructed by the control unit 120 (220). Further, the transmission processing unit 131 (231) converts the signal related to the symbol stream obtained by the process at the previous stage into an analog signal, and performs amplification, filtering, and frequency up-conversion on the resulting signal.

The reception processing unit 132 (232) performs a frame reception process. Specifically, the reception processing unit 132 (232) restores the frame on the basis of the signal provided from the antenna control unit 133 (233). For example, the reception processing unit 132 (232) acquires a symbol stream by performing a process opposite to the signal transmission, for example, frequency down-conversion, digital signal conversion, and the like on a signal obtained from an antenna. Further, the reception processing unit 132 (232) acquires a frame by performing demodulation, decoding, and the like on the symbol stream obtained by the process at the previous stage and provides the acquired frame to the data processing unit 110 (210) or the control unit 120 (220).

The antenna control unit 133 (233) controls transmission and reception of signals via at least one antenna. Specifically, the antenna control unit 133 (233) transmits the signal generated by the transmission processing unit 131 (231) via the antenna and provides the signal received via the antenna to the reception processing unit 132 (232).

1-3. Detailed Functions of Wireless Communication Device

Next, details of functions of the wireless communication device 100 (200) according to the embodiment of the present disclosure will be described. Hereinafter, details of functions of the transmission device 100 and the reception device 200 will be separately described.

(A. Transmission Device)

First, functions of the transmission device 100 will be described.

(A-1. Generation of Valid Sequence Information)

The transmission device 100 generates sequence information (hereinafter, also referred to as valid sequence information) with which sequence numbers (hereinafter, also referred to as valid sequence numbers) of a data unit that is determined as being to be resent are specified. Specifically, the data unit is a service data unit (SDU) and will also simply be referred to as data in the following description. The control unit 120 generates valid sequence information with which sequence numbers of data that can be resent, in data stored in transmitted frames, are specified. More specifically, the data that can be resent is data corresponding to data of a transmission buffer, data, an ACK of which is requested of a transmission destination, data that is defined as a target of resending, or data that the transmission destination is caused to receive with priority. In addition, the valid sequence information is generated for each purpose of a frame that is formed as a protocol data unit (PDU) that is obtained by adding header information, an error detection code, and the like to the data unit. For example, the PDU may be a frame, and the purpose of the frame may be expressed by a frame type such as a frame directed to a multicast group, a management frame, or a broadcasting frame.

In a case in which data with the same TID is transmitted to a plurality of reception devices 200, for example, the control unit 120 decides a multicast group to which at least a part of the plurality of reception devices 200 belong. In this case, a sequence counter that counts the sequence numbers for TIDs is set, and the control unit 120 sets valid sequence information for the decided multicast group. Therefore, it is possible to provide a plurality of valid sequence information items for the same TID.

Then, the control unit 120 generates valid sequence information with which sequence numbers of data stored in the transmission buffer 112, for example, are specified. In addition, the control unit 120 generates valid sequence information with which sequence numbers of data, an ACK transmission of which is requested of the reception device 200, in data that has already been transmitted, for example, are specified. In addition, the control unit 120 generates valid sequence information, with which sequence numbers of data units other than data units that are not defined as targets of resending, such as broadcasting frames, for example, are specified. Also, the control unit 120 generates valid sequence information with which sequence numbers of data units with priority or importance that is higher than that of the other data units, for example, are specified.

In addition, the valid sequence information may be information in a bitmap form that has bits corresponding to the sequence numbers. For example, the valid sequence information may be bitmap information in which least significant bits (LSB) of bit sequences correspond to the sequence numbers of the data units that have the valid sequence information. In this case, a bit corresponding to valid sequence numbers is set to 1 while a bit corresponding to other sequence numbers is set to 0.

(A-2. Transmission of PDU)

Figure 4:
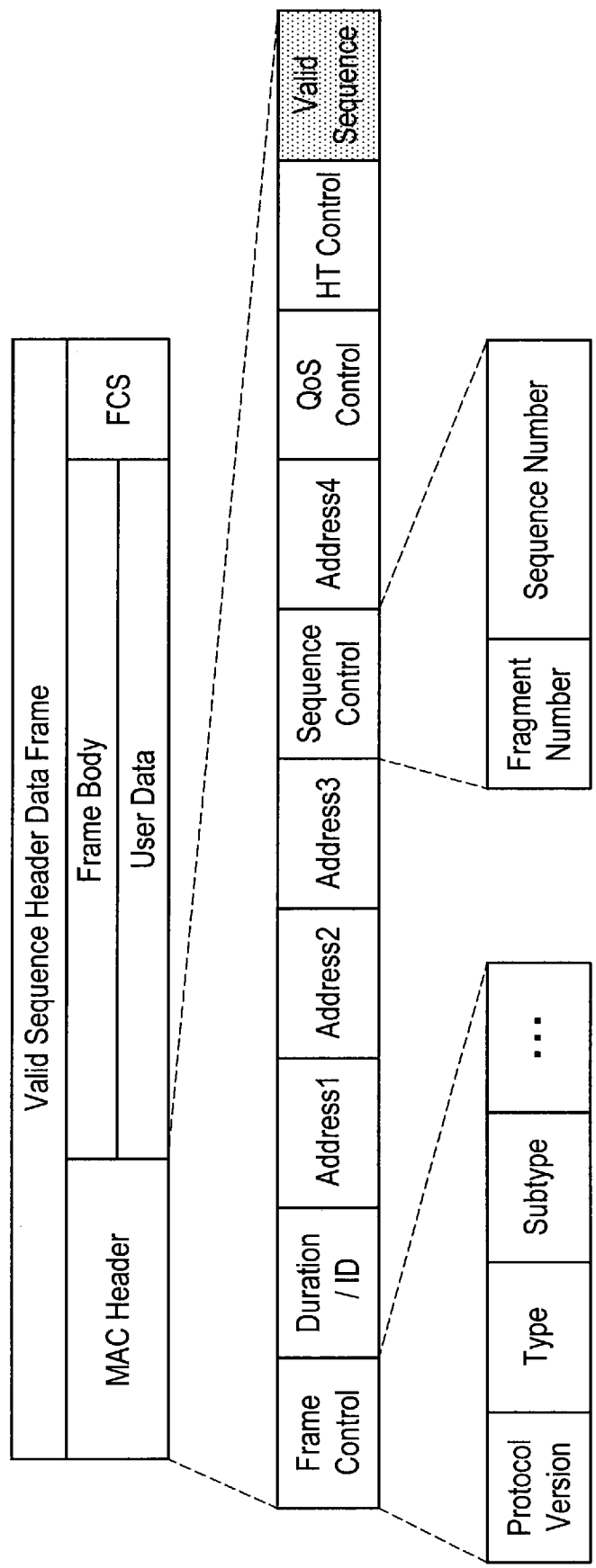
FIG. 4 is a diagram illustrating a configuration example of a frame that has valid sequence information in a header according to the embodiment of the present disclosure.

The transmission device 100 transmits frames that have valid sequence information. Specifically, the control unit 120 causes the data processing unit 110 to generate multicast frames that have valid sequence information generated in response to an occurrence of a multicast communication request and are directed to a decided multicast group. Then, the wireless communication unit 130 transmits the generated multicast frames. Further, a configuration of a frame that has valid sequence information will be described with reference to FIG. 4. FIG. 4 is a diagram illustrating a configuration example of a frame that has valid sequence information in a header according to the embodiment of the present disclosure.

The valid sequence information may be stored in the header of the frame. For example, the frame that has valid sequence information may be a data frame that has fields such as MAC Header, Frame Body, and Frame Check Sequence (FCS) as illustrated in FIG. 4. The MAC Header field further has fields such as Frame Control, Duration/ID. Address1, Address2, Address3, Sequence Control, Address4, QoS Control, HT Control, and Valid Sequence. In addition, the Frame Control field further has fields such as Protocol Version, Type, and Subtype. Also, the Sequence Control field further has fields such as Fragment Number and Sequence Number.

The valid sequence information is stored in the aforementioned Valid Sequence field. In addition, the Type and the Subtype fields in the aforementioned Frame Control field may be used to indicate that a frame is a frame that has valid sequence information. For example, a predetermined value "11" may be stored in the Type field while a predetermined value "0000" may be stored in the Subtype field. Note that an error detection code is stored in the FCS field.

Figure 5:
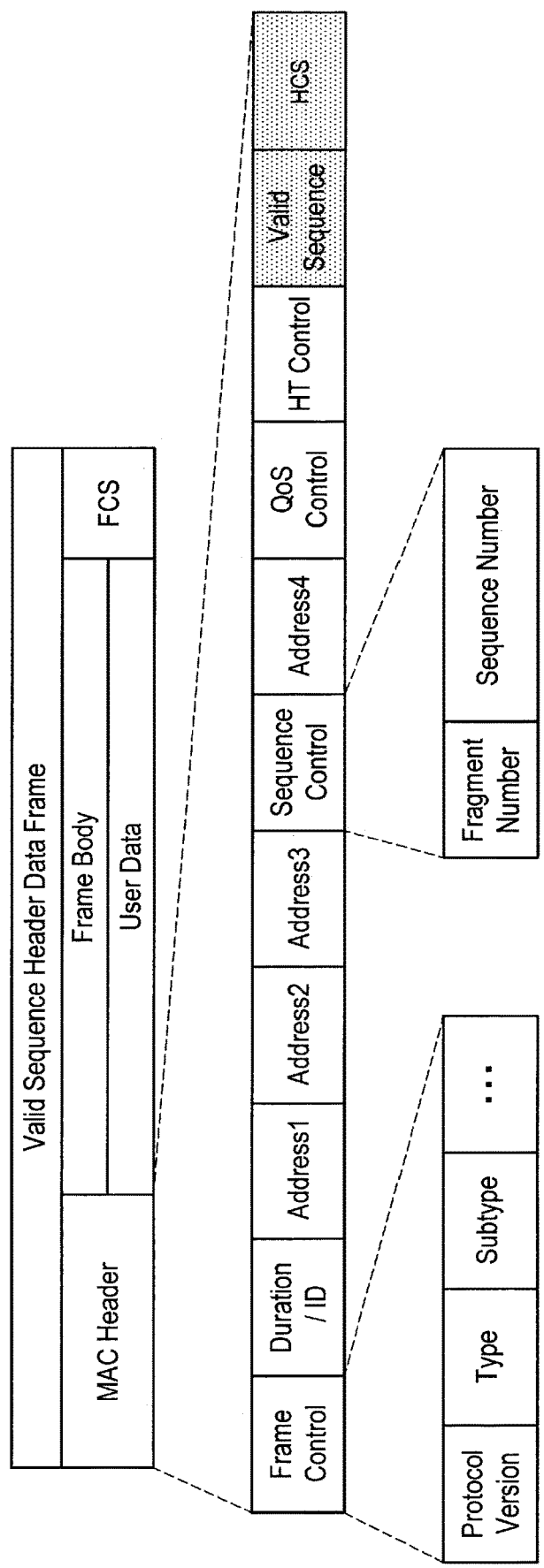
FIG. 5 is a diagram illustrating a configuration example of a frame that stores an error detection code in a header that has valid sequence information according to the embodiment of the present disclosure.

Note that the error detection code may be stored in the header of the frame. Specifically, the data processing unit 210 performs error detection processing of the header by using the error detection code stored in the header of the received frame. FIG. 5 is a diagram illustrating a configuration example of a frame in which an error detection code is stored in the header that has valid sequence information according to the embodiment of the present disclosure. As illustrated in FIG. 5, for example, a header check sequence (HCS) field is added to the end of the MAC Header field of the frame that has the valid sequence information. The error detection code is stored in the HCS field.

Figure 6:
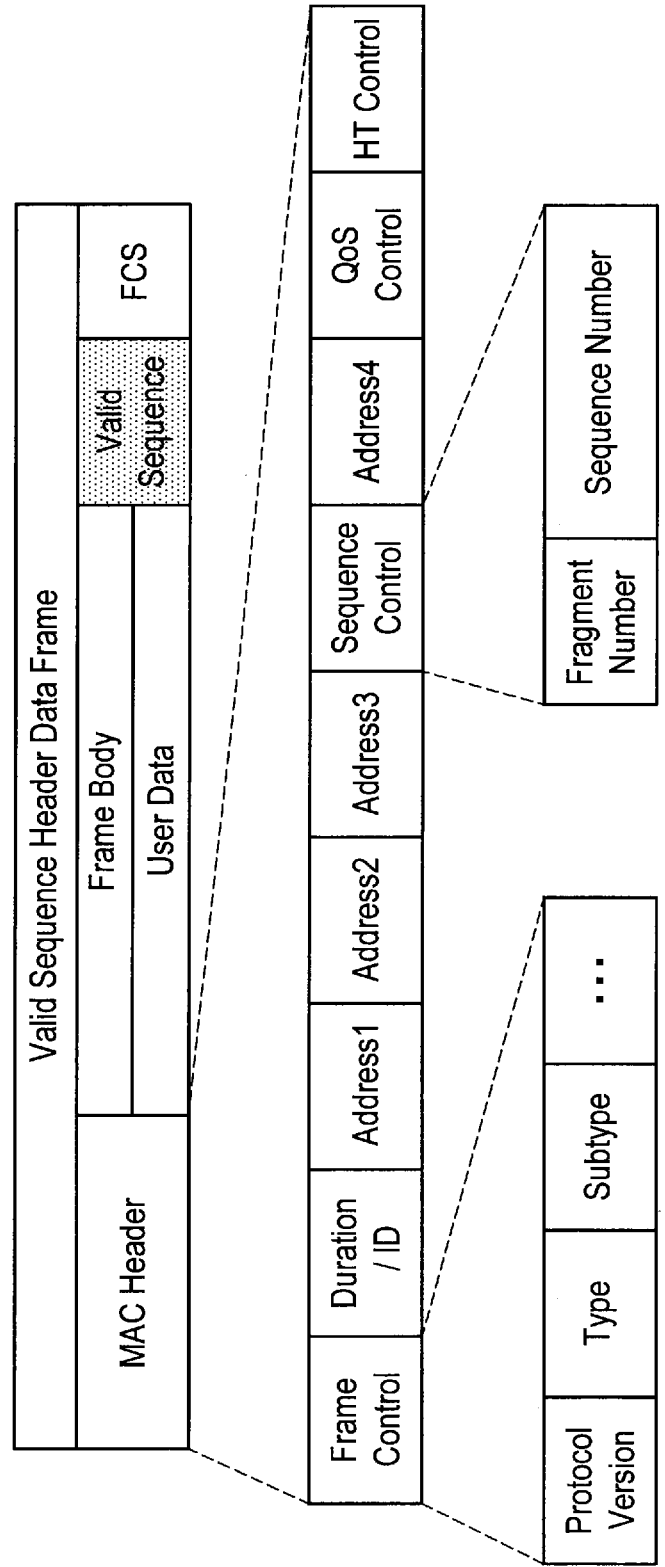
FIG. 6 is a diagram illustrating a configuration example of a frame that has valid sequence information in a trailer according to the embodiment of the present disclosure.

In addition, the valid sequence information may be stored in a part following the header. Specifically, the valid sequence information may be stored in a trailer of the frame. FIG. 6 is a diagram illustrating a configuration example of a frame that has valid sequence information in a trailer according to the embodiment of the present disclosure. As illustrated in FIG. 6, for example, the frame that has the valid sequence information has fields such as MAC Header, Frame Body, Valid Sequence, and FCS. The valid sequence information is stored in the Valid Sequence field.

Note that the valid sequence information may be stored in the frame body. In addition, the frame that has the valid sequence information may be a management frame instead of the aforementioned data frame.

(A-3. Reception of Acknowledgement and Resending of PDU)

The transmission device 100 receives an acknowledgement for a transmitted frame. Specifically, the wireless communication unit 130 receives an ACK frame for the frame after transmitting the frame that has the valid sequence information. Note that the ACK frame is transmitted on the basis of the valid sequence information. Details will be described later.

In addition, the transmission device 100 resends a data unit that has already been transmitted. Specifically, in a case in which it is determined that a data unit that has already been transmitted is to be resent, the control unit 120 causes the wireless communication unit 130 to resend the frame in which the data unit that has already been transmitted is stored if a resending timing is reached. For example, the control unit 120 may determine whether or not a predetermined time has elapsed after transmission of a frame corresponding to the data stored in the transmission buffer 112. In a case in which it is determined that the predetermined time has elapsed after the transmission of the frame, the control unit 120 causes the data processing unit 110 to generate a frame corresponding to the data and causes the wireless communication unit 130 to transmit the generated frame. Note that a frame that has already been transmitted may be maintained for a frame with a possibility of having to be resent, and in that case, the control unit 120 causes the wireless communication unit 130 to resend the frame without causing the data processing unit 110 to newly generate a frame.

(A-4. Updating of Valid Sequence Information)

The transmission device 100 adds new information to the valid sequence information. Specifically, when a frame to which a sequence number is added is newly transmitted, the control unit 120 adds information with which the sequence number is specified to the valid sequence information. For example, in a case in which the valid sequence information is in a bitmap form, the control unit 120 changes a bit corresponding to the sequence number of the frame newly transmitted from 0 to 1 in the bitmap.

In addition, the transmission device 100 deletes information from the valid sequence information. Specifically, the control unit 120 deletes information, with which the sequence number of a data unit that is determined as not to be resent is specified, from the valid sequence information. More specifically, the control unit 120 deletes information, with which the sequence number of a data unit for a received acknowledgement is specified, from the valid sequence information. If the ACK frame is received, the control unit 120 acquires the sequence number of the data that has already been transmitted for the ACK frame, for example. Then, the control unit 120 changes the bit corresponding to the acquired sequence number from 1 to 0 in the bitmap of the valid sequence information.

In addition, more specifically, the control unit 120 deletes information with which the sequence number of the data unit, after transmission of which the predetermined time has elapsed, is specified from the valid sequence information. For example, a valid period is set for the data stored in the transmission buffer 112. If the valid period has elapsed after transmission of the frame corresponding to the data, the control unit 120 acquires the sequence number of the data, the valid period of which has elapsed. Then, the control unit 120 changes the bit corresponding to the acquired sequence number from 1 to 0 in the bitmap of the valid sequence information.

Further, the transmission device 100 releases the data of the sequence number related to the information deleted from the valid sequence information from the transmission buffer 112. Specifically, the control unit 120 causes the data processing unit 110 to delete data, the reception of which has been confirmed by using a received ACK frame, or data, the valid period of which has elapsed, from the transmission buffer 112.

(B. Reception Device)

Next, functions of the reception device 200 will be described.

(B-1. Reception of PDU)

The reception device 200 receives a frame that has valid sequence information. Specifically, the wireless communication unit 230 receives a multicast frame that has valid sequence information transmitted from the transmission device 100. Then, in a case in which the reception device 200 (itself) belongs to a multicast group that is a destination of the multicast frame, the data processing unit 210 acquires data and the valid sequence information from the multicast frame.

(B-2. Release from Reception Buffer)

The reception device 200 releases data from the reception buffer 215 on the basis of valid sequence information. Specifically, in a case in which it is determined that a series of data has been received on the basis of the valid sequence information, the control unit 220 releases the series of data from the reception buffer 215. In a case in which it is determined that a start sequence number indicated by the valid sequence information is the same as a previous start sequence number, and when all the respective data items with a valid sequence number specified from the valid sequence information have been received, for example, the control unit 220 releases the respective data items with a valid sequence number from the reception buffer 215. Note that the release of the data may be provision of the data to a higher-order layer of the communication or another function of the reception device 200 via the interface unit 211 or may be discarding of the data.

Also, specifically, the control unit 220 releases data that is determined as no longer to be resent from the reception buffer 215 on the basis of the valid sequence information. In a case in which it is determined that the start sequence number indicated by the valid sequence information is different from the previous start sequence number, for example, the control unit 220 releases data with sequence numbers that are equal to or less than the current start sequence number from the reception buffer 215.

Note that in a case in which it is determined that the aforementioned series of data has been received, and when a part of the series of data is missing, the control unit 220 may partially release the series of data from the reception buffer 215. Specifically, in a case in which it is determined that sequence numbers of data stored in the reception buffer 215 are non-sequential for a PDU purpose on the basis of the valid sequence information, the control unit 220 releases the data of the sequential parts. For example, the control unit 220 determines whether or not the sequence numbers of the received data are non-sequential in terms of a series of valid sequence numbers specified from valid sequence information for a frame purpose corresponding to the frame. In a case in which it is determined that the sequence numbers are non-sequential, the control unit 220 releases data with the valid sequence numbers continuing from the start sequence numbers (the next sequence number in a case in which data of the start sequence number has not yet been received) indicated by the valid sequence information from the reception buffer 215.

(B-3. Transmission of Acknowledgement)

The reception device 200 performs an acknowledgement to a received frame. Specifically, the control unit 220 causes the data processing unit 210 to generate an ACK frame for the reception frame on the basis of valid sequence information. More specifically, the control unit 220 causes the data processing unit 210 to generate the ACK frame only for data units with valid sequence numbers specified from the valid sequence information. In a case in which a sequence number of received data is a valid sequence number, for example, the control unit 220 causes the data processing unit 210 to generate the ACK frame. Specifically, in a case in which a bit corresponding to the sequence number of the received data is 1 in the bitmap of the valid sequence information, the control unit 220 causes the data processing unit 210 to generate the ACK frame. Note that the sequence number is also separately set for the ACK frame.

1-4. Processing of Wireless Communication Device

Next, processing of the wireless communication device 100 (200) according to the embodiment of the present disclosure will be described.

(A. Transmission Device)

Figure 7:
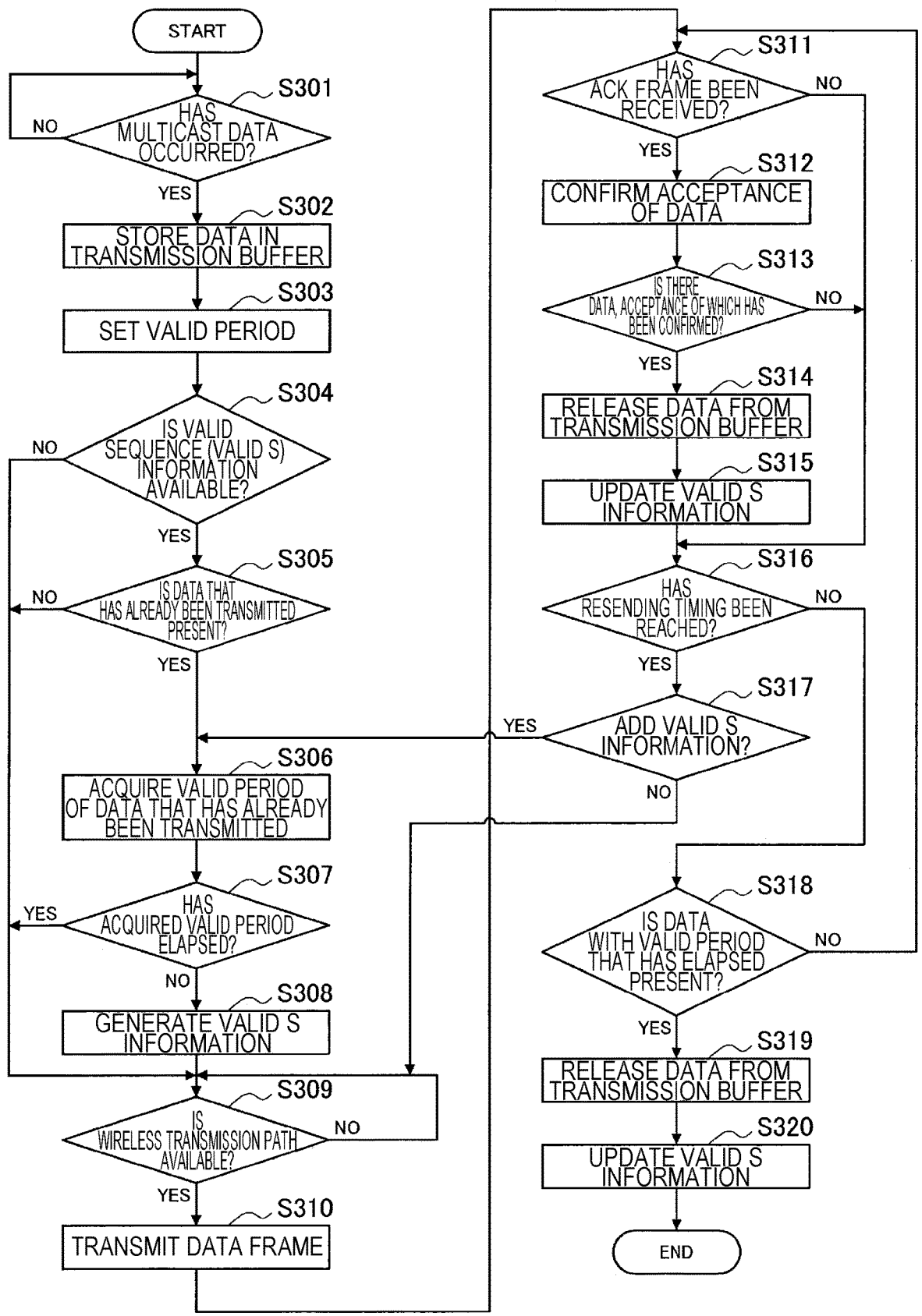
FIG. 7 is a flowchart conceptually illustrating an example of processing performed by a transmission device according to the embodiment of the present disclosure.

First, processing of the transmission device 100 will be described with reference to FIG. 7. FIG. 7 is a flowchart conceptually illustrating an example of processing performed by the transmission device 100 according to the embodiment of the present disclosure.

The transmission device 100 determines whether or not multicast data has been generated (Step S301). Specifically, the data processing unit 110 determines whether or not data, transmission of which through multicast communication is desired, has been provided via the interface unit 111.

In a case in which it is determined that multicast data has been generated, the transmission device 100 stores the multicast data in the transmission buffer 112 for each communication sequence of a multicast group (Step S302). Specifically, if multicast data is provided, the data processing unit 110 stores the multicast data in the transmission buffer 112 prepared for each group address of the multicast.

Next, the transmission device 100 sets a valid period of the data (Step S303). Specifically, the control unit 120 sets a valid period for the multicast data stored in the transmission buffer 112. Note that a valid period may not be set for data that is not to be resent or data, an acknowledgement of which is not required. The valid period of the data is a period during which the data is valid until the data is delivered to a communication counterpart, that is, a period during which there is a possibility that the data may be resent.

Next, the transmission device 100 determines whether or not valid sequence information is available (Step S304). Specifically, the control unit 120 determines whether or not communication using valid sequence information is available.

If it is determined that valid sequence information is available, the transmission device 100 determines whether or not there is data that has already been transmitted (Step S305). Specifically, in a case in which communication using valid sequence information is available, the control unit 120 determines whether or not data that has already been transmitted by using a communication sequence of the multicast group is present.

If it is determined that data that has already been transmitted is present, the transmission device 100 acquires the valid period of the data that has already been transmitted (Step S306). Specifically, in a case in which data that has already been transmitted is present in the communication sequence of the multicast group, the control unit 120 acquires a valid period that has been set in the past for the data that has already been transmitted.

Next, the transmission device 100 determines whether or not the acquired valid period has elapsed (Step S307). Specifically, the control unit 120 determines whether or not the valid period of the data that has already been transmitted has elapsed before the current point.

If it is determined that the acquired valid period has not elapsed, the transmission device 100 generates valid sequence information (Step S308). Specifically, if the valid period of the data that has already been transmitted has not elapsed before the current time, the control unit 120 generates valid sequence information that has information with which sequence numbers of the data that has already been transmitted in a communication sequence of the multicast group is identified.

Next, the transmission device 100 determines whether or not a wireless transmission path is available (Step S309). Specifically, the wireless communication unit 130 determines whether or not a wireless transmission path is available by performing carrier sense processing or the like.

If it is determined that a wireless transmission path is available, the transmission device 100 transmits a data frame (Step S310). Specifically, if it is determined that a wireless transmission path is available, the wireless communication unit 130 transmits a data frame that has the valid sequence information generated by the data processing unit 110 on the basis of an instruction from the control unit 120.

Thereafter, the transmission device 100 waits for reception of the ACK frame (Step S311). Specifically, the wireless communication unit 130 waits for reception of the ACK frame for the transmitted data frame.

If the ACK frame is received, the transmission device 100 confirms acceptance of the data (Step S312). Specifically, the control unit 120 specifies data related to the sequence number corresponding to the ACK. More specifically, if the ACK frame is received by the wireless communication unit 130, the control unit 120 specifies the data that has already been transmitted on the basis of the ACK frame. The data specified as described above is data, the acceptance of which has been confirmed.

Next, the transmission device 100 determines whether or not data, the acceptance of which has been confirmed, is present (Step S313). Specifically, the control unit 120 determines whether the sequence number of the data, the acceptance of which has been confirmed, coincides with any of the valid sequence numbers included in the valid sequence information. Note that the control unit 120 may determine whether or not the data, the acceptance of which has been confirmed, is present in the transmission buffer 112.

If it is determined that data, the acceptance of which has been confirmed, is present, the transmission device 100 releases the data, the acceptance of which has been confirmed, from the transmission buffer 112 (Step S314). Specifically, in a case in which the sequence number of the data, the acceptance of which has been confirmed, coincides with the valid sequence number, the control unit 120 causes the data processing unit 110 to delete the data, the acceptance of which has been confirmed, from the transmission buffer 112.

Next, the transmission device 100 updates the valid sequence information (Step S315). Specifically, the control unit 120 removes the sequence number of the data, the acceptance of which has been confirmed, from the valid sequence numbers.

In addition, the transmission device 100 determines whether or not a resending timing has been reached (Step S316). Specifically, the control unit 120 determines whether or not the resending timing of the data frame that has already been transmitted has been reached.

If it is determined that the resending timing has been reached, the transmission device 100 determines whether or not the valid sequence information is available (Step S317). Specifically, if the resending timing of the frame that has already been transmitted has been reached, the control unit 120 determines whether or not to add the valid sequence information to the frame to be resent.

If it is determined to add the valid sequence information, the processing is made to proceed to Step S306. Otherwise, the processing is made to proceed to Step S309.

In addition, the transmission device 100 determines whether or not there is data, the valid period of which has elapsed (Step S318). Specifically, the control unit 120 determines whether or not the valid period has elapsed for each data item stored in the transmission buffer 112.

If it is determined that the data, the valid period of which has elapsed, is present, the transmission device 100 releases the data from the transmission buffer 112 (Step S319). Specifically, in a case in which the data, the valid period of which has elapsed, is present, the control unit 120 deletes the data from the transmission buffer 112. This is because the data, the valid period of which has elapsed, is no longer to be resent.

Next, the transmission device 100 updates the valid sequence information (Step S320). Specifically, the control unit 120 removes information related to the sequence number of the deleted data from the valid sequence numbers.

(B. Reception Device)

Figure 8:
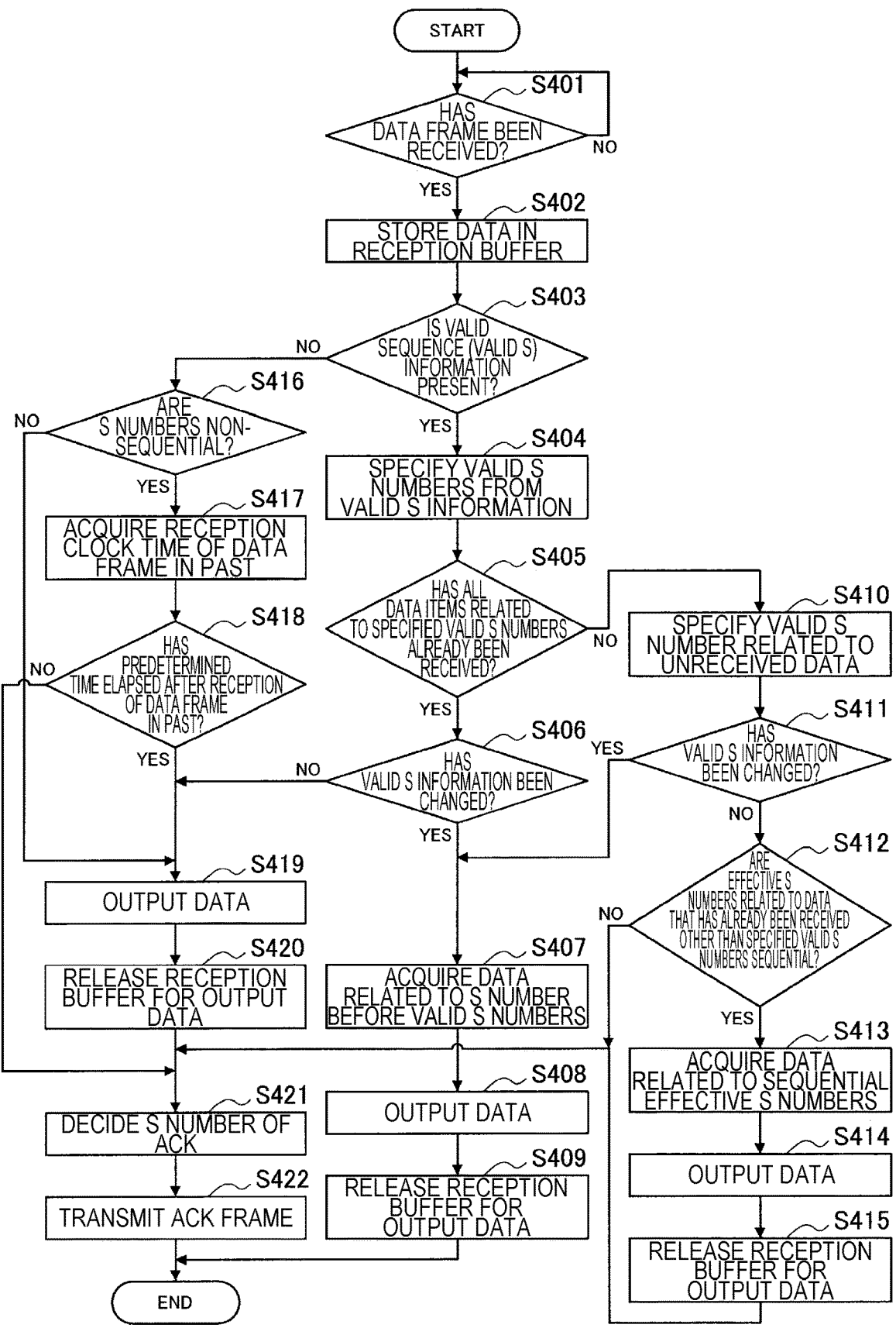
FIG. 8 is a flowchart conceptually illustrating an example of processing performed by a reception device according to the embodiment of the present disclosure.

Next, processing performed by the reception device 200 will be described with reference to FIG. 8. FIG. 8 is a flowchart conceptually illustrating an example of processing performed by the reception device 200 according to the embodiment of the present disclosure.

The reception device 200 waits for reception of the data frame (Step S401), and if the data frame is received, the reception device 200 stores data acquired from the data frame in the reception buffer 215 (Step S402). Specifically, if the data frame is received by the wireless communication unit 230, the data processing unit 210 acquires data from the received data frame and stores the acquired data in the reception buffer 215.

Next, the reception device 200 determines whether or not the received data frame has valid sequence information (Step S403). Specifically, the data processing unit 210 determines whether or not valid sequence information has been added to the received data frame.

In a case in which it is determined that the received data frame has valid sequence information, the reception device 200 specifies valid sequence numbers from the valid sequence information (Step S404). Specifically, if it is determined that the valid sequence information has been added to the received data frame by the data processing unit 210, the control unit 220 acquires the valid sequence information. Then, the control unit 220 specifies valid sequence numbers that are sequence numbers of data transmitted in the past from the acquired valid sequence information and valid sequence numbers that are sequence numbers of data stored in the received data frame.

Next, the reception device 200 determines whether or not all the data items with the specified valid sequence numbers have already been received (Step S405). Specifically, the control unit 220 determines whether or not data with the specified valid sequence numbers is stored in the reception buffer 215.

If it is determined that all the data items with the specified valid sequence numbers have been received, the reception device 200 determines whether or not there is a change in the valid sequence information (Step S406). Specifically, in a case in which data with the specified valid sequence numbers is stored in the reception buffer 215, the control unit 220 determines whether or not the valid sequence information is different from previous valid sequence information. For example, the control unit 220 may determine whether or not a start sequence number of the valid sequence information has changed. In this manner, whether or not there is data that is no longer to be resent is determined.

If it is determined that the valid sequence information has been changed, the reception device 200 acquires data with a sequence number before the valid sequence numbers (Step S407). Specifically, if it is determined that the valid sequence information is different from the previous one, the control unit 220 causes the data processing unit 210 to acquire data with a sequence number before the valid sequence numbers of the valid sequence information from the reception buffer 215.

Next, the reception device 200 outputs the acquired data (Step S408). Specifically, the data processing unit 210 outputs the acquired data to another function of the reception device 200, an external device, or the like via the interface unit 211.

Next, the reception device 200 releases the reception buffer 215 for the output data (Step S409). Specifically, the data processing unit 210 releases a region, in which the output data is stored, in the reception buffer 215.

Note that although it is assumed that the data with up to the valid sequence numbers after the change is output in Step S408 described above, data with up to the valid sequence numbers after the change may be discarded in a case in which a sequence number of data that has not been delivered is present in up to the valid sequence numbers after the change. Specifically, the data is not output in Step S408, and the region, in which the data is stored, in the reception buffer is released in Step S409.

In a case in which it is determined that at least a part of the data related to the specified valid sequence numbers has not been received in Step S405, the reception device 200 specifies a valid sequence number of the data that has not yet been received (Step S410). Specifically, the control unit 220 specifies the valid sequence number of the data that has not yet been received in the specified valid sequence numbers.

Next, the reception device 200 determines whether or not the valid sequence information has been changed (Step S411). Specifically, the control unit 220 determines whether or not the valid sequence information is different from the previous one.

If it is determined that the valid sequence information has not changed, the reception device 200 determines whether or not the valid sequence numbers of the data that has already been received other than the specified valid sequence number are sequential (Step S412). Specifically, if it is determined that the valid sequence information is different from the previous one, the control unit 220 determines whether or not the valid sequence numbers of the data that has already been received other than the specified valid sequence number of the unreceived frame are sequential.

If it is determined that the valid sequence numbers of the data that has already been received other than the specified valid sequence number are sequential, the reception device 200 acquires data related to the sequential valid sequence numbers (Step S413). Specifically, if it is determined that the valid sequence numbers of the data that has already been received other than the specified valid sequence number of the unreceived data are sequential, the control unit 220 causes the data processing unit 210 to acquire the data with the sequential valid sequence numbers from the reception buffer 215.

Next, the reception device 200 outputs the acquired data (Step S414) and releases the reception buffer 215 for the output data (Step S415). Specifically, the data processing unit 210 outputs the acquired data to another function of the reception device 200, an external device, or the like via the interface unit 211. Then, the data processing unit 210 releases the region, in which the output data is stored, in the reception buffer 215. Then, the processing is made to proceed to Step S421, which will be described later.

If it is determined that valid sequence information is not present in Step S403, the reception device 200 determines whether or not the sequence numbers are non-sequential (Step S416). Specifically, the control unit 220 determines whether or not the sequence numbers of the data stored in the received data frame and the sequence numbers of the data received in the past are non-sequential.

If it is determined that the sequence numbers are non-sequential, the reception device 200 acquires a reception clock time of the data frame received in the past (Step S417). Specifically, if it is determined that the sequence numbers of the received data and the sequence numbers of the data received in the past are non-sequential, the control unit 220 acquires the reception clock time of the data frame received in the past.

Next, the reception device 200 determines whether or not a predetermined time has elapsed after the reception of the data frame in the past (Step S418). Specifically, the control unit 220 determines whether or not a predetermined time has elapsed after the reception of the data frame in the past.

If it is determined that the predetermined time has elapsed after the reception of the data frame in the past, the reception device 200 outputs the data (Step S419) and releases the reception buffer 215 for the output data (Step S420). Specifically, if it is determined that the predetermined time has elapsed after the reception of the data frame in the past, the control unit 220 causes the data processing unit 210 to output data corresponding to the data frame from the reception buffer 215. Then, the data processing unit 210 releases the region, in which the output data is stored, in the reception buffer 215. Note that since data with non-sequential sequence numbers is present, the data with the non-sequential sequence numbers may be discarded in Step S419. Specifically, the data is not output in Step S419 described above, and the region, in which the data is stored, in the reception buffer is released in Step S420.

Next, the reception device 200 decides a sequence number of an ACK (Step S421). Specifically, the control unit 220 causes the data processing unit 210 to generate an ACK frame for the frame corresponding to the output data. In addition, the control unit 220 decides the sequence number of the ACK frame and causes information indicating the decided sequence number to be stored in the ACK frame.

Next, the reception device 200 transmits the ACK frame by using the specified sequence number (Step S422). Specifically, the wireless communication unit 130 transmits the ACK frame that has the decided sequence number to the transmission device 100.

1-5. Application Examples

The configurations of the wireless communication system and the wireless communication device 100 (200) according to the embodiment of the present disclosure have been described above. Next, application examples of the wireless communication system will be described with reference to FIG. 9. FIG. 9 is a diagram for describing an operation example of the wireless communication system according to the embodiment of the present disclosure.

An example of sequence numbers, frame purposes, and bitmaps of valid sequence information (hereinafter, also referred to as valid sequence maps) of data communicated between the transmission device 100 and the reception device 200 is illustrated in FIG. 9.

First, a frame with a sequence number "1" and a frame purpose "Multicast A" is communicated. The frame is a multicast data frame directed to a multicast group A, for example. In addition, an LSB of the valid sequence map corresponds to the sequence number "1" of data stored in the frame, and the valid sequence number is "1" since the LSB is "1".

Next, a frame with a sequence number "2" and a frame purpose "Multicast B" is communicated. The frame is a multicast data frame directed to a multicast group B, for example. In addition, an LSB of the valid sequence map corresponds to the sequence number "2" of data stored in the frame, and the valid sequence number is "2" since the LSB is "1".

Next, a frame with a sequence number "3" and a frame purpose "Multicast A" is communicated. An LSB of the valid sequence map corresponds to the sequence number "3" of data stored in the frame, and the valid sequence numbers are "3" and "1" since the LSB and the second bit counted from the LSB are "1". Note that although the sequence numbers are non-sequential numbers, the numbers are handled as sequential numbers as valid sequence numbers for the frame purpose "Multicast A".

Next, a frame with a sequence number "4" and a frame purpose "Broadcast" is communicated. Here, since a broadcasting frame is not a target of resending, a value of the valid sequence map is 0. Therefore, a valid sequence number is not present for the frame purpose "Broadcast".

Then, a frame with a sequence number "5" and a frame purpose "Multicast A' is communicated, and a frame with a sequence number "6" and a frame purpose "Multicast B" is communicated. Further, a frame with a frame number "7" and a frame purpose "Multicast A" is communicated, and a frame with a sequence number "8" and a frame purpose "Multicast A" is communicated. Then, a frame with a sequence number "9" and a frame purpose "Multicast B" is communicated.

Next, a frame with a sequence number "10" and a frame purpose "Management" is communicated. The frame is a management frame, for example. Since the management frame is a target of resending as a data unit, a value is set in the valid sequence map. Specifically, an LSB of the valid sequence map corresponds to the sequence number "10" of the frame, and the valid sequence number is "10" since the LSB is "1".

Next, a frame with a sequence number "11" and a frame purpose "Multicast A" is communicated. Here, the valid sequence number "1" has been deleted from the valid sequence map. Specifically, since the LSB of the valid sequence map corresponds to the sequence number "11" of the data stored in the frame, valid sequence numbers specified by calculating back the bit with a value "1" on the basis of the LSB are "11", "8", "7", "5", and "3", and "1" has been deleted. This means that the data with the sequence number "1" is no longer to be resent. Therefore, it is possible to release the data with the sequence number "1" from the reception buffer 215 in the reception device 200.

Then, a frame with a sequence number "12" and a frame purpose "Multicast A" is communicated, and a frame with a sequence number "13" and a frame purpose "Broadcast" is communicated.

Next, a frame with a sequence number "14" and a frame purpose "Multicast B" is communicated. Here, the valid sequence number "2" has been deleted from the valid sequence map. Specifically, since an LSB of the valid sequence map corresponds to the sequence number "14" of the data stored in the frame, the valid sequence numbers specified by calculating back the bit with a value of "1" on the basis of the LSB are "14", "9", and "6", and "2" has been deleted. This means that the data with the sequence number "2" is no longer to be resent.

Next, a frame with a sequence number "15", a frame purpose "Multicast A", and a valid sequence map that is a valid sequence map from which the valid sequence number "3" has been deleted is communicated. Therefore, the valid sequence numbers are "15", "12", "11", "8", "7", and "5". This means that the data with the sequence number "3" is no longer to be resent.

Next, a frame with a sequence number "16", a frame purpose "Multicast A". and a valid sequence map that is a valid sequence map from which the valid sequence numbers "5" and "7" have been deleted is communicated. Therefore, the valid sequence numbers are "16", "15", "12", "11", and "8". This means that the data with the sequence numbers "5" and "7" is no longer to be resent. In this manner, there are also cases in which two or more valid sequence numbers are deleted.

Next, a frame with a sequence number "17", a frame purpose "Multicast B", and a valid sequence map that is a valid sequence map from which the valid sequence numbers "6" and "9" have been deleted is communicated. Therefore, the valid sequence numbers are "17" and "14". This means that the data with the sequence numbers "6" and "9" is no longer to be resent.

Next, a frame with a sequence number "18" and a frame purpose "Multicast C" is communicated. The frame is a multicast data frame directed to a multicast group C, for example. However, since the multicast data frame is not a target of resending unlike the cases of the multicast groups A and B, and transmission of an ACK is not required, the value of the valid sequence map is 0. Therefore, a valid sequence number is not present for the frame purpose "Multicast C".

Next, a frame with a sequence number "19" and a frame purpose "Management" is communicated. Since the management frame is not a target of resending, the value of the valid sequence map is 0. Therefore, a valid sequence number is not present for the frame purpose "Management".

Next, a frame with a sequence number "20", a frame purpose "Multicast B", and a valid sequence map that is a valid sequence map from which the valid sequence numbers "14" and "17" have been deleted is communicated. Therefore, the valid sequence number is "20". This means that the data with the sequence numbers "14" and "17" is no longer to be resent.

1-6. Summary of Embodiment of the Present Disclosure

According to the embodiment of the present disclosure, the transmission device 100 generates a PDU that has valid sequence information with which the sequence numbers of the data units that are determined as being to be resent are identified and transmits the generated PDU as described above. Also, the reception device 200 receives the PDU that has the valid sequence information with which the sequence numbers of the data units that are determined as being to be resent are specified and acquires the valid sequence information from the received PDU.

In the related art, the reception device waits for resending until data with a missing sequence number is received or until time-out occurs if the sequence number of the data, the reception of which has been failed, is missing and the sequence numbers become non-sequential. Therefore, the reception buffer is not released during the waiting, which interrupts reception of data other than the resent data. In addition, a technology of storing information indicating an ACK policy for the plurality of MAC frames in a physical frame that has the plurality of MAC frames has also been proposed. However, since the target of the ACK policy is only the MAC frames in the physical frame, it is not possible to ascertain an ACL policy for MAC frames in a physical frame in the past, for example. Further, since the ACK policy is not updated, it is difficult for the reception device to determine whether or not there is a room for resending.

In contrast, according to the embodiment of the present disclosure, it is possible for the reception device 200 to appropriately determine whether or not a missing sequence number is a sequence number of data, the resending of which is to be waited for, by the reception device 200 being notified of the sequence number of the data with a possibility of having to be resent. Therefore, the data held by the reception buffer 215 is optimized, and a vacant region in the reception buffer 215 can be secured. As a result, it is possible to improve the efficiency of wireless communication even in a case in which the sequence numbers of the received data are non-sequential.

In addition, the aforementioned valid sequence information is generated for each PDU purpose. In the related art, the sequence numbers are shared even if the frame purposes are different, for example. Therefore, the sequence numbers are non-sequential in the reception device in a case in which transmission destinations of data are different depending on the frame purposes. In contrast, according to the present configuration, it is possible to handle the sequence numbers as if the sequence numbers were substantially sequential by the reception device 200 even if the sequence numbers are non-sequential. Therefore, it is possible to prevent having to wait for resending of the data that is not directed to the reception device itself in a case in which the frame purposes are different and to thereby improve the efficiency of wireless communication.

In addition, the aforementioned valid sequence information is stored in the header of the PDU. Therefore, it is possible to acquire the valid sequence information by using existing processing of receiving the header. Therefore, new reception processing for the valid sequence information is not added, and it is possible to reduce complication of the processing of receiving the PDU.

In addition, the aforementioned header has an error detection code. Therefore, it is possible to perform error detection processing only on the header. Therefore, in a case in which the received PDU is not a PDU directed to the reception device itself or to the multicast group to which the reception device itself belongs to, it is possible to omit the reception processing for the part following the header.

In addition, the aforementioned valid sequence information is stored in the part following the header of the PDU. Here, since a lot of information has already been stored in the header, it is difficult to add new information in some cases. In contrast, according to the present disclosure, it is possible to communicate the valid sequence information without affecting the header.

In addition, the aforementioned data unit that is determined as being to be resent may include multicast data. Here, there is concern that the sequence numbers may be non-sequential as described above in the multicast communication. In contrast, it is possible to maintain or improve the efficiency of wireless communication even if the sequence numbers become non-sequential in the multicast communication, by the configuration according to the embodiment of the present disclosure being applied to the multicast communication. Note that the multicast frame may have valid sequence information.

In addition, the aforementioned data unit that is determined as being to be resent includes a data unit that is stored in the transmission buffer 112, a data unit, an acknowledgement of which is required of a transmission destination, a data unit defined as a target of resending, or a data unit that the transmission destination is caused to receive with priority. Therefore, it is possible to easily ascertain data that is a target that is determined as being to be resent in the transmission device 100. In addition, since the reliability of the determination of resending differs depending on the aforementioned types of data, it is possible to select the reliability of the determination of resending by selecting the types of data.

In addition, the transmission device 100 deletes information with which a sequence number of a data unit that is no longer to be resent is specified from the aforementioned valid sequence information. Therefore, it is possible to ascertain the data that is no longer to be resent in the reception device 200. Therefore, it is possible to prevent the reception device 200 from waiting for the resending of the data that is no longer to be resent.

In addition, the transmission device 100 receives an acknowledgement for the data unit related to the transmitted PDU, and the aforementioned data unit that is no longer to be resent includes a data unit regarding the received acknowledgement. Here, the reception of the acknowledgement means that the PDU, in other words, data has been delivered to the reception device 200. Therefore, according to the present configuration, it is possible to delete information with which the sequence number of data, resending of which is definitely not required, is specified from the valid sequence information. Therefore, it is possible to prevent occurrence of leakage of data resending.

In addition, the aforementioned acknowledgement received by the transmission device 100 is transmitted on the basis of the aforementioned valid sequence information. In addition, the reception device 200 transmits the acknowledgement regarding the data unit related to the received PDU on the basis of the aforementioned valid sequence information. Therefore, the reception device 200 can transmit the acknowledgement in accordance with whether or not the received data is data that is determined as being to be resent. Therefore, it is possible to improve the efficiency of transmission of the acknowledgement.

Note that the reception device 200 may control the transmission of the acknowledgement in accordance with whether or not the sequence number of the received data is specified from the valid sequence information. For example, in a case in which the sequence number of the received data is a valid sequence number, the reception device 200 may continue to transmit the ACK frame for the data until the data is resent or until the sequence number of the data is removed from the valid sequence numbers. In addition, in a case in which the sequence number of the received data is not a valid sequence number, the reception device 200 may not transmit the ACK frame for the data or transmit the ACK frame for the data only once. In this manner, it is possible to effectively transmit the acknowledgement.

In addition, the aforementioned data unit that is no longer to be resent includes a data unit, after the transmission of which a predetermined time (valid period) has elapsed. Here, the data is generally resent at predetermined time intervals until the valid period has elapsed. However, in a case in which the acknowledgement is not received in the valid period, it is considered that a possibility of the reception is also low even after the valid period. Therefore, according to the present configuration, it is possible to delete the data with a low possibility of reception from the valid sequence information. Therefore, it is possible to prevent unnecessary resending of the data.

In addition, the aforementioned acknowledgement is transmitted only for the data unit with the sequence number that is specified from the aforementioned valid sequence information. Therefore, it is possible to reduce a transmission frequency of the acknowledgement by the acknowledgement being transmitted only for the data that is determined as being to be resent. Therefore, it is possible to reduce the amount of communication.

In addition, data in the reception buffer 215 is released on the basis of the aforementioned valid sequence information. Therefore, it is possible to release the PDU that is not determined as being to be resent and data that is no longer to be resent from the reception buffer 215. Therefore, it is possible to reduce pressure on a vacant region in the reception buffer 215 due to the data that is not to be resent.

In addition, in a case in which it is determined that the sequence numbers of data stored in the reception buffer 215 are non-sequential for the PDU purpose on the basis of the aforementioned valid sequence information, data is released for sequential sequence numbers. In the related art, there is a case in which the reception buffer 215 is not released until data with the missing sequence number is received if non-sequentiality of the sequence numbers occurs. In contrast, according to the present configuration, it is possible to partially release the data even if non-sequentiality of the sequence numbers occurs. Therefore, it is possible to secure a vacant region in the reception buffer 215 before the reception of data with a missing sequence number.

1-7. Modification Examples

The embodiment of the present disclosure has been described above. Note that the embodiment is not limited to the aforementioned example. Hereinafter, first and second modification examples of the embodiment will be described.

First Modification Example

Figure 10:
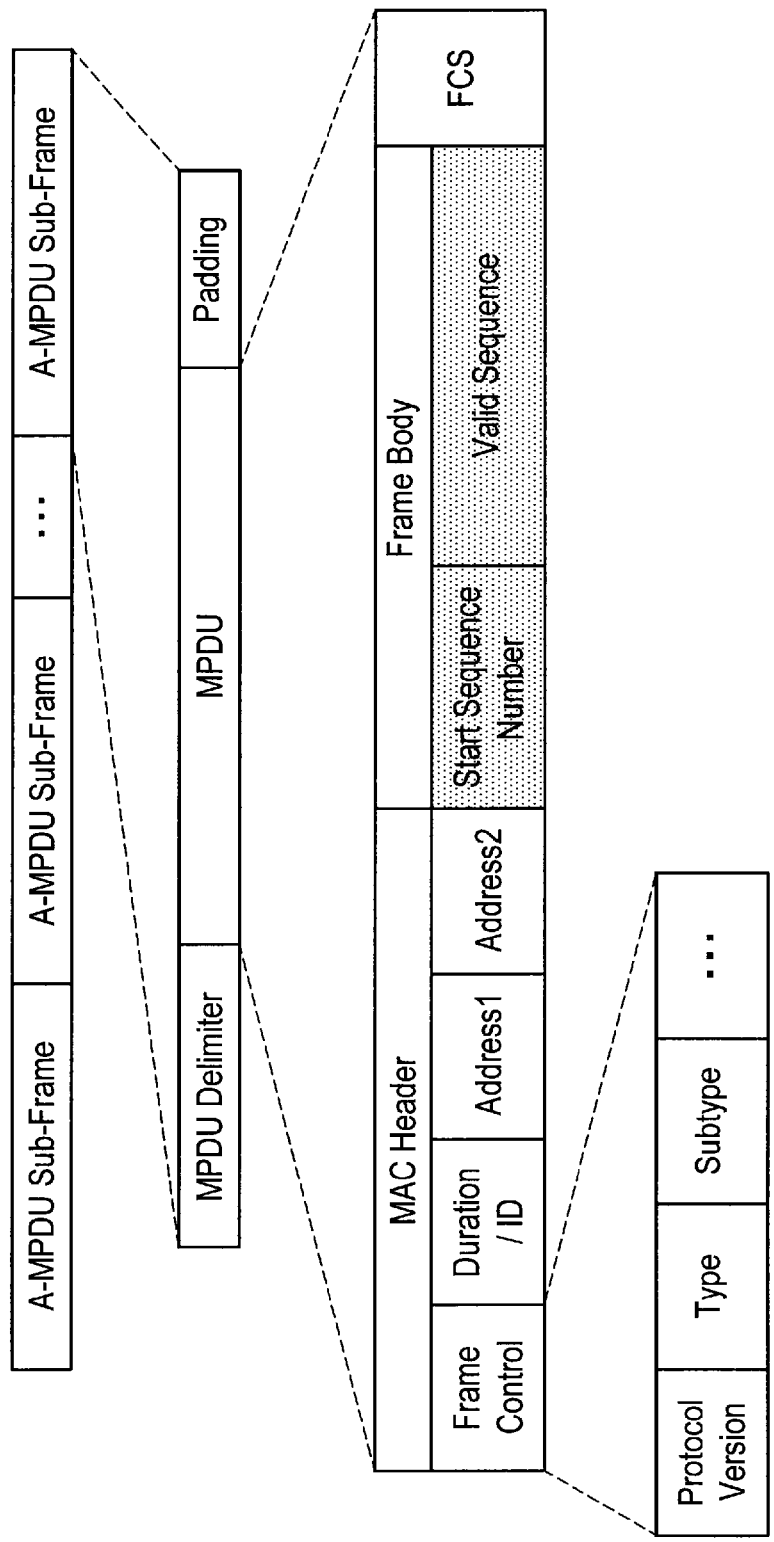
FIG. 10 is a diagram illustrating a configuration example of an aggregation frame that has valid sequence information in a sub-frame according to a first modification example of the embodiment of the present disclosure.

In the first modification example, valid sequence information may be stored in a sub-frame of an aggregation frame. In addition, the valid sequence information may have information (hereinafter, also referred to as start sequence number information) with which a start sequence number is specified. Specifically, the transmission device 100 stores valid sequence information for the frame purpose in a predetermined subframe in the aggregation frame and transmits the aggregation frame. The reception device 200 receives the aggregation frame and acquires the valid sequence information from the predetermined sub-frame of the received aggregation frame. Further, details of the frame that has the valid sequence information according to the first modification example will be described with reference to FIG. 10. FIG. 10 is a diagram illustrating a configuration example of the aggregation frame that has the valid sequence information in the sub-frame according to the first modification example of the embodiment of the present disclosure.

The aggregation frame according to the first modification example has a plurality of aggregate MAC PDU (A-MPDU) Sub-Frames as illustrated in FIG. 10. For example, A-MPDU Sub-Frame at the end has MPDU Delimiter, MPDU, and Padding, and fields such as Start Sequence Number and Valid Sequence are provided in the Frame Body field of the MPDU. The aforementioned start sequence number information is stored in the Start Sequence Number field, and a bitmap in the valid sequence information is stored in the Valid Sequence field.

Note that although the example in which the valid sequence information is stored in the frame body of the sub-frame is illustrated in FIG. 10, the valid sequence information may be stored in the header or the trailer of the sub-frame. In addition, although the example in which the sub-frame with the valid sequence information stored therein is the sub-frame at the end has been described, the valid sequence information may be stored in any other sub-frame.

Next, an application example of the wireless communication system according to the first modification example will be described with reference to FIG. 11. FIG. 11 is a diagram for explaining an operation example of the wireless communication system according to the first modification example of the embodiment of the present disclosure. Note that description that would be substantially the same as the above description using FIG. 9 will be omitted.

An example of sequence numbers, frame purposes, start sequence numbers of the valid sequence information (hereinafter, also simply referred to as start sequence numbers), and bitmaps of the valid sequence information of data communicated between the transmission device 100 and the reception device 200 is illustrated in FIG. 11. Note that in the first modification example, the valid sequence maps are bitmap information in which most significant bits (MSB) of bit sequences correspond to sequence numbers of a frame that has valid sequence information.

First, a frame with a sequence number "1", a frame purpose of "Multicast A", and a start sequence number "1" is communicated. An MSB of the valid sequence map corresponds to the start sequence number "1", and the valid sequence number is "1" since the MSB is "1".

Next, a frame with a sequence number "2". a frame purpose "Multicast B", and a start sequence number "2" is communicated. An MSB of the valid sequence map corresponds to the start sequence number "2", and the valid sequence number is "2" since the MSB is "1".

Next, a frame with a sequence number "3", a frame purpose "Multicast A", and a start sequence number "1" is communicated. An MSB of the valid sequence map corresponds to the start sequence number "1", and the valid sequence numbers are "1" and "3" since the MSB and the second bit counted from the MSB are "1".

Next, a frame with a sequence number "4", a frame purpose "Broadcast", and a start sequence number "4" is communicated. Here, since the broadcasting frame is not a target of resending, a value of the valid sequence map is 0. Therefore, a valid sequence number is not present for the frame purpose "Broadcast".

Thereafter, some frames are received. The reception device 200 determines whether or not the valid sequence information has been changed by determining whether or not the start sequence number has been changed.

Next, a frame with a sequence number "11", a frame purpose "Multicast A", and a start sequence number "3" is communicated. Here, the start sequence number is changed from "1", which is the previous start sequence number, to "3". In this manner, the valid sequence numbers are "3", "5", "7", "8", and "11". This means that the data with the sequence number "1" is no longer to be resent. Therefore, it is possible to release the data with the sequence number "1" from the reception buffer 215 in the reception device 200.

Next, after some frames are received, a frame with a sequence number "14", a frame purpose "Multicast B", and a start sequence number "6" is communicated. Here, the start sequence number has changed from "2", which is the previous start sequence number, to "6". In this manner, the valid sequence numbers are "6", "9", and "14". This means that the data with the sequence number "2" is no longer to be resent.

Hereinafter, processing is performed on frames that are similarly received.

In this manner, according to the first modification example of the embodiment of the present disclosure, the valid sequence information has the information with which the start sequence number is specified. Therefore, it is possible to easily ascertain the change in the valid sequence information as compared with a case in which the change in the valid sequence information is ascertained on the basis of content (for example, a bitmap value) of the valid sequence information. Therefore, it is possible to reduce the amount and the load of the communication processing using the valid sequence information.

In addition, the aforementioned valid sequence information is stored in the sub-frame of the aggregation frame. Therefore, it is possible to transmit the valid sequence information along with a frame in which the valid sequence information is not stored to the reception device 200. In other words, it is not necessary to separately transmit the frame including the valid sequence information. Therefore, it is possible to improve the efficiency of the communication processing of the valid sequence information since a transmission opportunity therefor is not separately secured.

Second Modification Example

Figure 12:
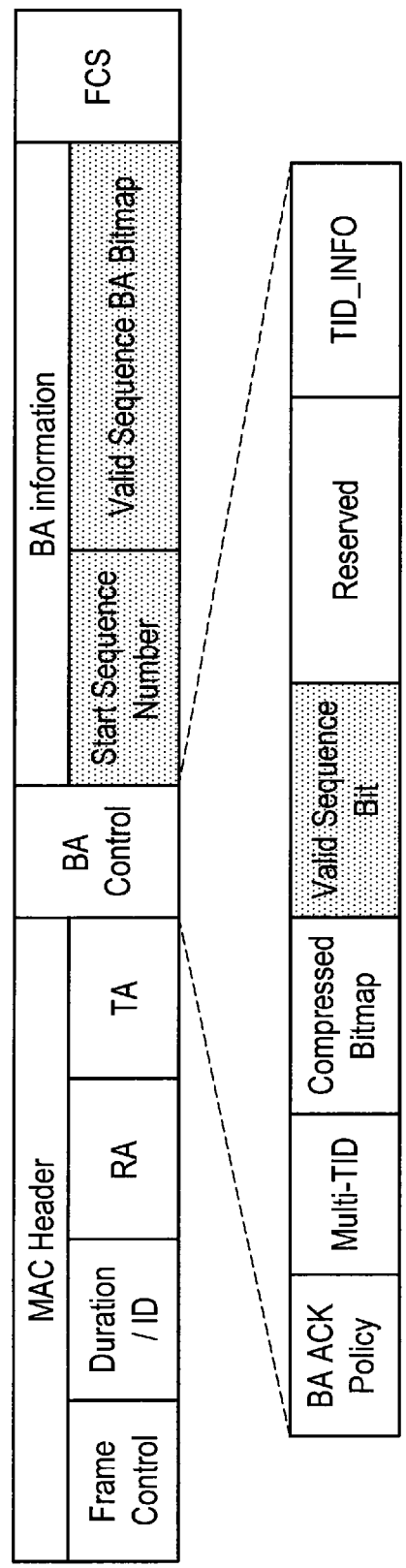
FIG. 12 is a diagram illustrating a configuration example of a block ACK frame that uses valid sequence information according to a second modification example of the embodiment of the present disclosure.

In the second modification example, an acknowledgement transmitted from the reception device 200 may be a block ACK. Specifically, if a plurality of frames are received, the control unit 220 causes the data processing unit 210 to generate a block ACK frame for the plurality of frames. Then, the wireless communication unit 230 transmits the generated block ACK frame. A block ACK start number of the block ACK frame is a start sequence number of the valid sequence information. Further, a configuration of the block ACK frame using the valid sequence information according to the second modification example will be described with reference to FIG. 12. FIG. 12 is a diagram illustrating a configuration example of the block ACK frame using the valid sequence information according to the second modification example of the embodiment of the present disclosure.

As illustrated in FIG. 12, the block ACK frame has fields such as MAC Header, Block ACK (BA), Control, BA Information, and FCS. The BA Control field further has fields such as BA ACK Policy, Multi-TID, Compressed Bitmap, Valid Sequence Bit, Reserved, and TID_INFO. In the Valid Sequence field, information indicating that the block ACK frame is a block ACK frame using the valid sequence information is stored. In addition, the BA Information field further has fields such as Start Sequence Number and Valid Sequence BA Bitmap. The start sequence number of the BA bitmap is stored in the Start Sequence Number field, and the BA bitmap set on the basis of the valid sequence number and the sequence number of the received frame is stored in the Valid Sequence BA Bitmap field.

For example, in a case in which the received valid sequence information has not changed, the control unit 220 generates block ACK information for sequence numbers (hereinafter, also referred to as a received valid sequence numbers) of received data from among valid sequence numbers. In detail, the block ACK information includes a start sequence number of a BA bitmap for the received valid sequence numbers and the BA bitmap.

Next, the control unit 220 causes the data processing unit 210 to generate the block ACK frame including the generated block ACK information. Then, the generated block ACK frame is transmitted by the wireless communication unit 230.

Note that although the example in which the block ACK frame is transmitted without receiving a block ACK request frame has been described above, the aforementioned block ACK frame may be transmitted in response to reception of the block ACK request frame.

In this manner, according to the second modification example, the acknowledgement transmitted by the reception device 200 includes the block ACK frame. Therefore, it is possible to reduce the number of ACK frames transmitted. Therefore, it is possible to further enhance the effect of improving the efficiency of communication that is caused by using the valid sequence information.

In addition, the block ACK start number of the aforementioned block ACK frame is a start sequence number of the valid sequence information. Therefore, it is possible to generate the block ACK information by utilizing the valid sequence information. Therefore, it is possible to simplify processing of generating the block ACK information.

2. APPLICATION EXAMPLE

The technology according to the present disclosure can be applied to various products. For example, the wireless communication device 200 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the wireless communication device 200 may be realized as terminals that perform machine to machine (M2M) communication (also referred to as machine type communication (MTC) terminals) such as smart meters, vending machines, remotely controlled monitoring devices, or point of sale (POS) terminals. Furthermore, the wireless communication device 200 may be wireless communication modules mounted in such terminals (for example, integrated circuit modules configured by one die).

On the other hand, for example, the wireless communication device 100 may be realized as a wireless LAN access point (also referred to as a wireless base station) which has a router function or does not have a router function. The wireless communication device 100 may be realized as a mobile wireless LAN router. The wireless communication device 100 may also be a wireless communication module (for example, an integrated circuit module configured with one die) mounted on such devices.

2-1. First Application Example

Figure 13:
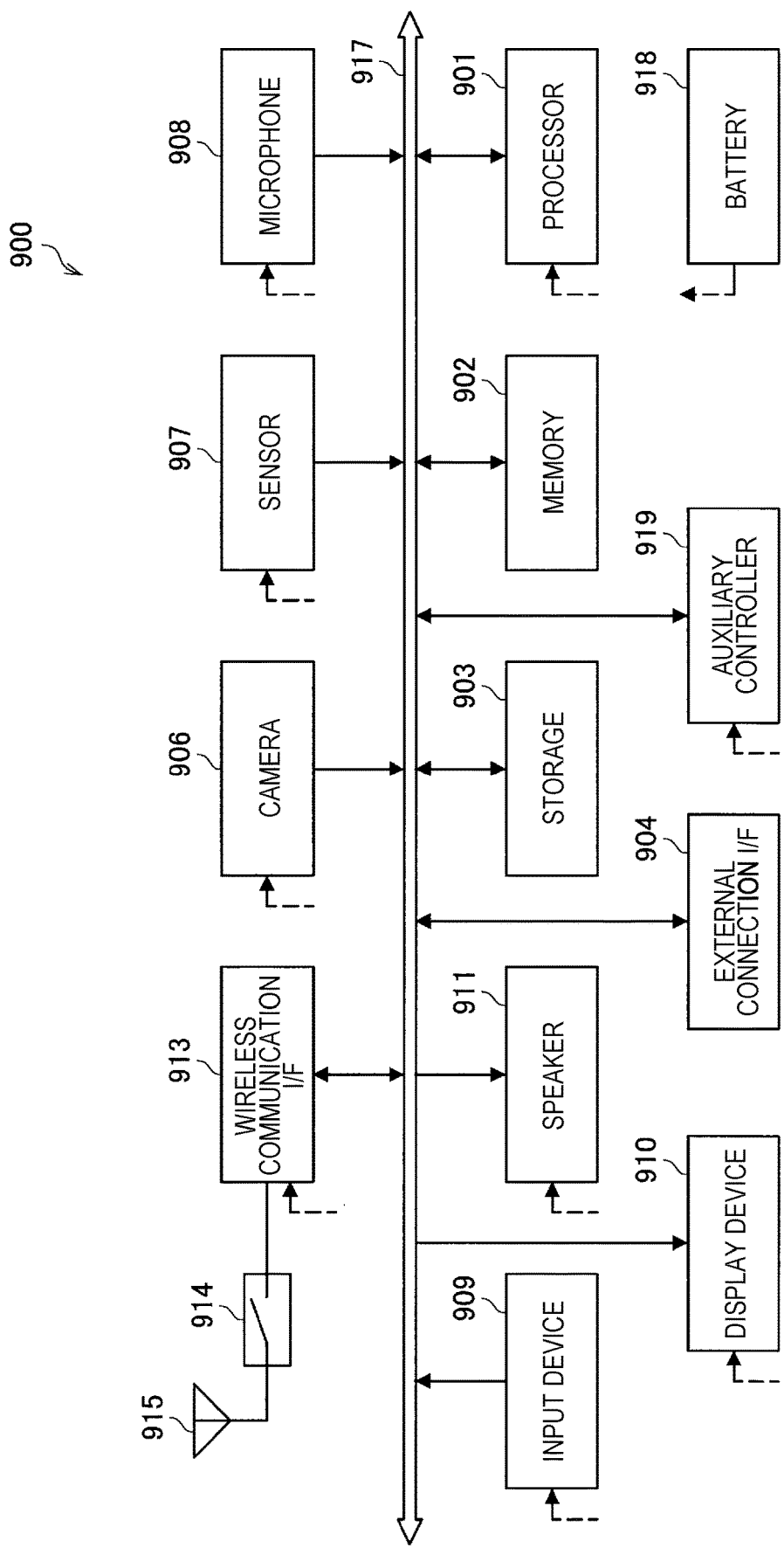
FIG. 13 is a block diagram illustrating an example of a schematic configuration of a smartphone.

FIG. 13 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11e, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 13. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 13 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 13, the data processing unit 210, the control unit 220, and the wireless communication unit 230 described above with reference to FIG. 3 may be implemented in the wireless communication interface 913. Further, at least some of the functions may be implemented in the processor 901 or the auxiliary controller 919. For example, the wireless communication unit 230 receives a PDU that has valid sequence information, and the data processing unit 210 acquires the valid sequence information. Then, the control unit 220 performs transmission of an acknowledgement, release of the reception buffer 215, or the like on the basis of the acquired valid sequence information. In this manner, it becomes possible to improve the efficiency of wireless communication even in a case in which the sequence numbers of data received by the smartphone 900 are non-sequential.

Note that the smartphone 900 may operate as a wireless access point (software AP) as the processor 901 executes the function of an access point at an application level. In addition, the wireless communication interface 913 may have the function of a wireless access point.

2-2. Second Application Example

Figure 14:
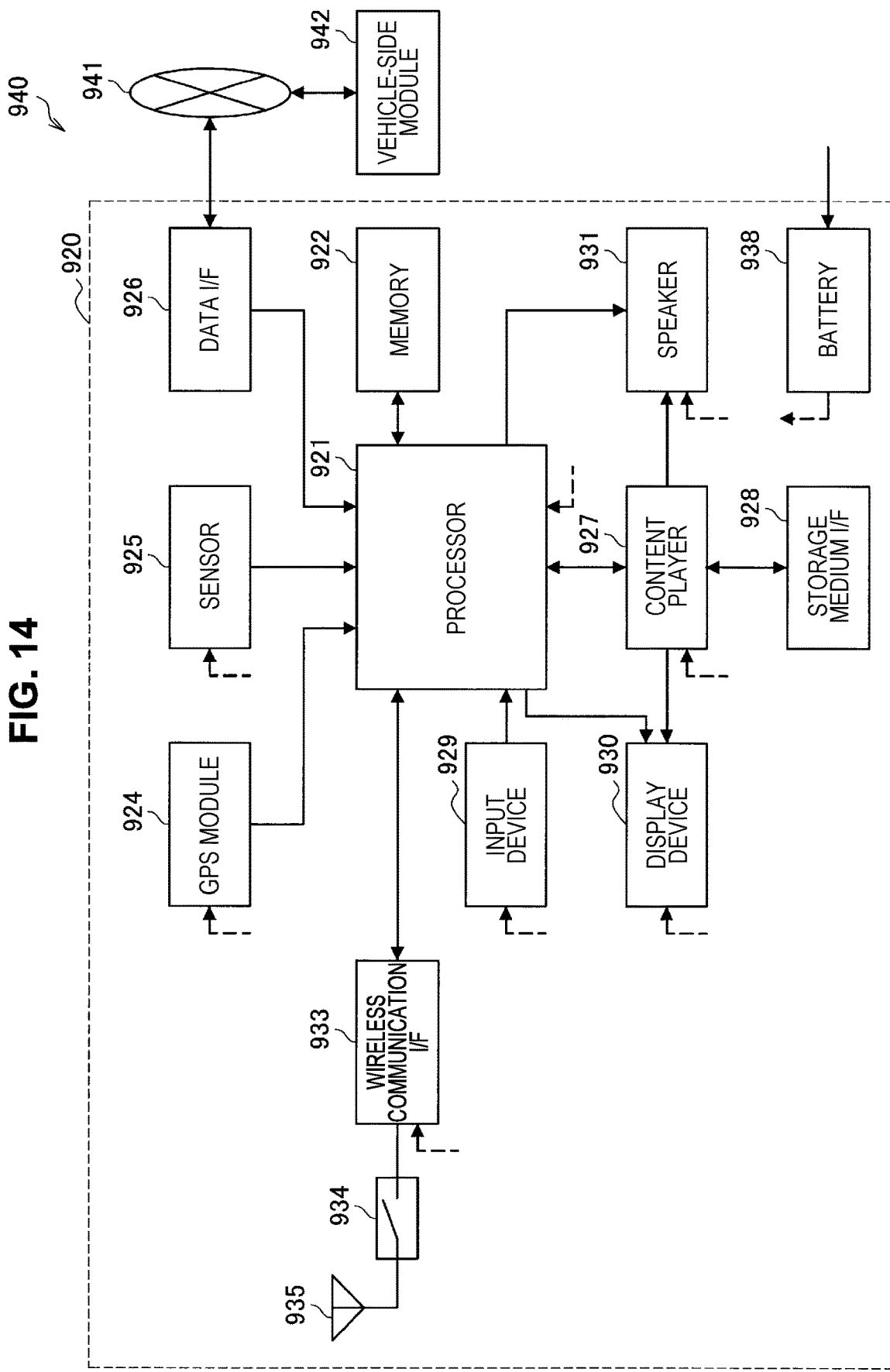
FIG. 14 is a block diagram illustrating an example of a schematic configuration of a car navigation device.

FIG. 14 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11e, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 14. In this case, the antenna switch 934 may be omitted from the configuration of the car navigation device 920.

The battery 938 supplies electric power to each of the blocks of the car navigation device 920 illustrated in FIG. 14 via power supply lines partially indicated by dashed lines in the drawing. In addition, the battery 938 accumulates electric power supplied from the vehicle side.

In the car navigation device 920 illustrated in FIG. 14, the data processing unit 210, the control unit 220, and the wireless communication unit 230 described above with reference to FIG. 5 may be implemented in the wireless communication interface 933. Further, at least some of the functions may be implemented in the processor 921. For example, the wireless communication unit 230 receives a PDU that has valid sequence information, and the data processing unit 210 acquires the valid sequence information. Then, the control unit 220 performs transmission of a acknowledgement, release of the reception buffer 215, or the like on the basis of the acquired valid sequence information. In this manner, it becomes possible to improve the efficiency of wireless communication even in a case in which the sequence numbers of data received by the car navigation device 920 are non-sequential.

In addition, the wireless communication interface 933 may operate as the aforementioned wireless communication device 100 and provide wireless connection to a terminal that a user in a vehicle has. At that time, the control unit 120 causes the data processing unit 110 to generate a PDU that has valid sequence information, for example. The wireless communication unit 130 transmits the generated PDU. In this manner, it is possible to improve the efficiency of wireless communication even in a case in which the sequence numbers of received data are non-sequential at a transmission destination of the PDU transmitted by the car navigation device 920.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

2-3. Third Application Example

Figure 15:
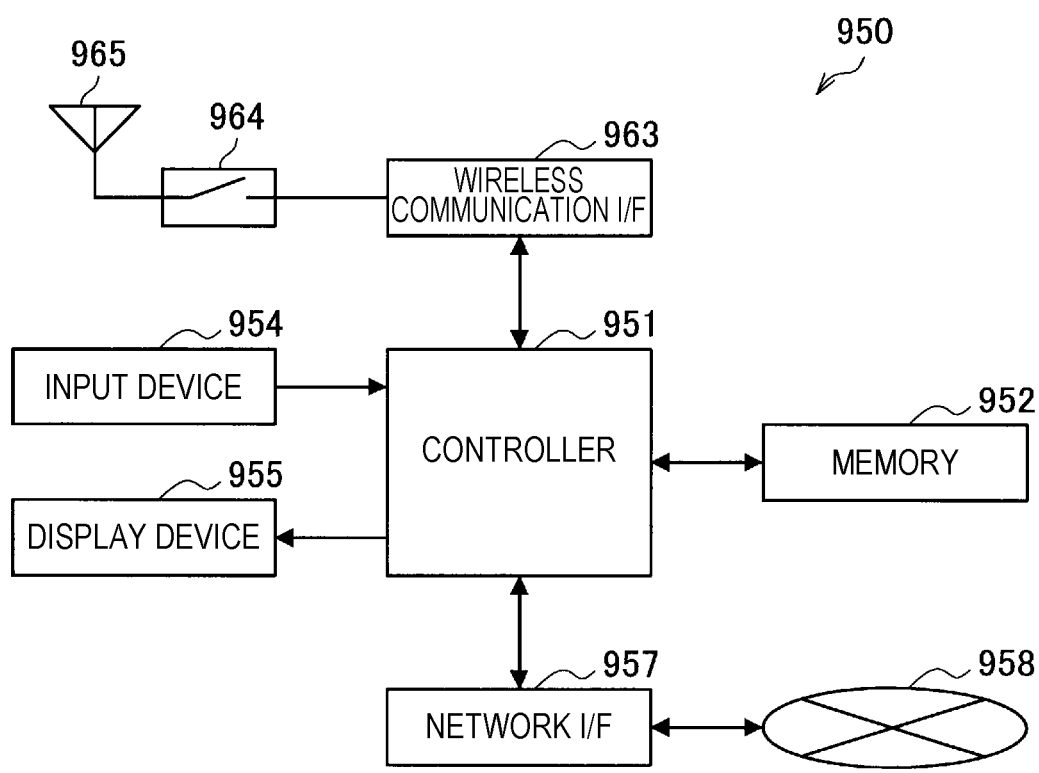
FIG. 15 is a block diagram illustrating an example of a schematic configuration of a wireless access point.

FIG. 15 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11e, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 15, the data processing unit 110, the control unit 120, and the wireless communication unit 130 described above with reference to FIG. 3 may be realized by the wireless communication interface 963. In addition, at least a part of these functions may be implemented by the controller 951. For example, the control unit 120 may cause the data processing unit 110 to generate a PDU that has valid sequence information. The wireless communication unit 130 transmits the generated PDU. In this manner, it is possible to improve the efficiency of wireless communication even in a case in which the sequence numbers of the received data are non-sequential at the transmission destination of the PDU transmitted by the wireless access point 950.

3. CONCLUSION

According to the embodiment of the present disclosure, it is possible for the reception device 200 to appropriately determine whether or not a missing sequence number is a sequence number of data, resending of which is to be waited for, by the reception device 200 being notified of the sequence number of data with a possibility of having to be resent as described above. Therefore, the data held by the reception buffer 215 is optimized, and a vacant region in the reception buffer 215 can be secured. As a result, it is possible to improve the efficiency of wireless communication even in a case in which the sequence numbers of the received data are non-sequential.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the valid sequence information is stored in a single PDU or aggregated PDUs in the aforementioned embodiment, the present technology is not limited to such an example. For example, the valid sequence information may be stored in any of a plurality of multiplexed PDUs. In detail, multiplexing includes time division multiplexing, code division multiplexing, frequency division multiplexing, orthogonal frequency division multiplexing, space division multiplexing, or the like.

In addition, although the example in which the block ACK frame is transmitted in accordance with a change in the valid sequence information has been described in the aforementioned embodiment, the block ACK frame may be arbitrarily transmitted in a period during which transmission is permitted. For example, the reception device 200 may transmit the block ACK frame at an arbitrary timing at its own transmission opportunity (TXOP). Alternatively, the block ACK frame may be transmitted after elapse of a back-off period.

In addition, although the example in which the PDU is a frame has been described in the aforementioned embodiment, the PDU may be another type of PDU. For example, the PDU may be a packet.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in a wireless communication device 100 (200) to exhibit functions equivalent to those of the respective logic configurations of the aforementioned wireless communication device 100 (200). In addition, a storage medium that stores the computer program therein is also provided.

Additionally, the present technology may also be configured as below.

(1)

A wireless communication device including:

a processing unit that generates a protocol data unit (PDU) that has sequence information with which a sequence number of a data unit that is determined as being to be resent is specified; and a communication unit that transmits the PDU generated by the processing unit.

(2)

The wireless communication device according to (1), in which the sequence information is generated for each purpose of the PDU.

(3)

The wireless communication device according to (1) or (2), in which the sequence information has information with which a start sequence number is specified.

(4)

The wireless communication device according to any one of (1) to (3), in which the sequence information is stored in a header of the PDU.

(5)

The wireless communication device according to (4), in which the header has an error detection code.

(6)

The wireless communication device according to any one of (1) to (5), in which the sequence information is stored in a part following a header of the PDU.

(7)

The wireless communication device according to any one of (1) to (6), in which the sequence information is stored in a sub-frame of an aggregation frame.

(8)

The wireless communication device according to any one of (1) to (7), in which the data unit that is determined as being to be resent includes multicast data.

(9)

The wireless communication device according to any one of (1) to (8), in which the data unit that is determined as being to be resent includes a data unit that is stored in a transmission buffer, a data unit, an acknowledgement of which is requested of a transmission destination, a data unit that is defined as a target of resending, or a data unit that the transmission destination is caused to receive with priority.

(10)

The wireless communication device according to any one of (1) to (9), in which the processing unit deletes information, with which a sequence number of a data unit that is no longer to be resent is specified, from the sequence information.

(11)

The wireless communication device according to (10), in which the communication unit receives an acknowledgement for a data unit related to the transmitted PDU, and the data unit that is no longer to be resent includes a data unit related to the received acknowledgement.

(12)

The wireless communication device according to (11), in which the acknowledgement is transmitted on a basis of the sequence information.

(13)

The wireless communication device according to (11) or (12), in which the data unit that is no longer to be resent includes a data unit, after transmission of which a predetermined time has elapsed.

(14)

A wireless communication device including:

a communication unit that receives a protocol data unit (PDU) that has sequence information with which a sequence number of a data unit that is determined as being to be resent is specified; and an acquisition unit that acquires the sequence information from the PDU received by the communication unit.

(15)

The wireless communication device according to (14), in which the communication unit transmits an acknowledgement for the received PDU on a basis of the sequence information.

(16)

The wireless communication device according to (15), in which the acknowledgement includes a block acknowledgement (ACK) frame with a block ACK start number that is a start sequence number of the sequence information.

(17)

The wireless communication device according to (15) or (16), in which the acknowledgement is transmitted only for a data unit with a sequence number specified from the sequence information.

(18)

The wireless communication device according to any one of (15) to (17), in which data of a reception buffer is released on the basis of the sequence information.

(19)

The wireless communication device according to (18), in which the sequence information is generated for each purpose of the PDU, and in a case in which it is determined that sequence numbers of data units corresponding to data stored in the reception buffer are non-sequential for the purpose of the PDU on the basis of the sequence information, data is released for sequential sequence numbers.

(20)

A wireless communication method including, by using a processor:

generating a PDU that has sequence information with which a sequence number of a data unit that is determined as being to be resent is specified; and transmitting the generated protocol data unit (PDU).

REFERENCE SIGNS LIST 100 transmission device
110 data processing unit
120 control unit
130 wireless communication unit
200 reception device
210 data processing unit
220 control unit
230 wireless communication unit

The invention claimed is:

1. A wireless communication device comprising:
circuitry configured to
generate a plurality of protocol data units (PDUs) to be transmitted to one or more use groups, each PDU has sequence information including a sequence number of a data unit and valid sequence information of corresponding use group of the one or more use groups, the valid sequence information being updated by specifying at least one sequence number corresponding to at least one data unit which is a target of retransmission to the corresponding use group on a basis of use group; and
transmit each of the plurality of PDUs to each use group of the one or more use groups, wherein the each of the plurality of PDUs includes the valid sequence information which has been updated to manage two or more non-sequential sequence numbers corresponding to the use group as virtual sequence numbers for retransmission to the corresponding use group, by deleting a sequence number of a data unit that is no longer to be the target of retransmission to the corresponding use group, and by adding a sequence number of a data unit that is newly set to be the target of retransmission to the corresponding use group.

2. The wireless communication device according to claim 1, wherein the sequence information further has information of a start sequence number, when two or more data units are the target of retransmission to the corresponding use group.

3. The wireless communication device according to claim 1, wherein the sequence information is stored in a header of the corresponding PDU, respectively.

4. The wireless communication device according to claim 3, wherein the header has an error detection code.

5. The wireless communication device according to claim 1, wherein the sequence information is stored in a part following a header of the corresponding PDU, respectively.

6. The wireless communication device according to claim 1, wherein the sequence information is stored in a sub-frame of an aggregation frame.

7. The wireless communication device according to claim 1, wherein the one or more use groups include at least one of a first multicast group being destination of multicast data, a second multicast group being destination of multicast data which is different from the multicast data to be transmitted to the first multicast group, broadcast group being destination of broadcast data which is not the target of retransmission, and management group being destination of management data which is the target of retransmission.

8. The wireless communication device according to claim 7, wherein the data unit which is the target of retransmission to the corresponding use group includes a first data unit that is stored in a transmission buffer, a second data unit requesting an acknowledgement of transmission from destination, and a third data unit to be sent to destination with priority.

9. The wireless communication device according to claim 1,
wherein the data unit that is no longer to be the target of retransmission includes a data unit which the circuitry has received an acknowledgment for the data unit from other device related to the corresponding use group.

10. The wireless communication device according to claim 9, wherein the acknowledgement is transmitted on a basis of the sequence information.

11. The wireless communication device according to claim 9, wherein the data unit that is no longer to be the target of retransmission includes a data unit which a predetermined time for retransmission has elapsed.

12. A wireless communication device comprising:
circuitry configured to
receive a protocol data unit (PDU) that has sequence information including a sequence number of a data unit and valid sequence information of corresponding use group of one or more use groups, the valid sequence information being updated by specifying at least one sequence number corresponding to at least one data unit which is a target of retransmission to the corresponding use group on a basis of use group; and
acquire the sequence information from the PDU, wherein the PDU includes the valid sequence information which has been updated to manage two or more non-sequential sequence numbers corresponding to the use group as virtual sequence numbers for retransmission to the corresponding use group, by deleting a sequence number of a data unit that is no longer to be the target of retransmission to the corresponding use group, and by adding a sequence number of a data unit that is newly set to be the target of retransmission to the corresponding use group.

13. The wireless communication device according to claim 12, wherein the circuitry transmits an acknowledgement for the received PDU on a basis of the sequence information.

14. The wireless communication device according to claim 13, wherein the acknowledgement includes a block acknowledgement (ACK) frame with a block ACK start number that is a start sequence number included in the valid sequence information.

15. The wireless communication device according to claim 13, wherein the acknowledgement is transmitted only for a data unit with a sequence number specified from the valid sequence information.

16. The wireless communication device according to claim 13, wherein data of a reception buffer is released on the basis of the valid sequence information.

17. The wireless communication device according to claim 16, wherein when the sequence numbers of data units corresponding to the use group are non-sequential, data is released for sequential sequence numbers based on the valid sequence information.

18. A wireless communication method comprising, by using a processor:
generating a plurality of protocol data units (PDUs) to be transmitted to one or more use groups, each PDU has sequence information including a sequence number of a data unit and valid sequence information of corresponding use group of the one or more use groups, the valid sequence information being updated by specifying at least one sequence number corresponding to at least one data unit which is a target of retransmission to the corresponding use group on a basis of use group; and
transmitting each of the plurality of PDUs to each use group of the one or more use groups, wherein the each of the plurality of PDUs includes the valid sequence information which has been updated to manage two or more non-sequential sequence numbers corresponding to the use group as virtual sequence numbers for retransmission to the corresponding use group, by deleting a sequence number of a data unit that is no longer to be the target of retransmission to the corresponding use group, and by adding a sequence number of a data unit that is newly set to be the target of retransmission to the corresponding use group.

* * * * *